United States Patent
Park et al.

(10) Patent No.: US 9,543,074 B2
(45) Date of Patent: Jan. 10, 2017

(54) APPARATUS AND METHOD FOR WIRELESS POWER RECEPTION, APPARATUS AND METHOD FOR WIRELESS POWER TRANSMISSION, AND WIRELESS POWER TRANSMISSION SYSTEM

(71) Applicant: Samsung Electronics Co., Ltd., Suwon-si (KR)

(72) Inventors: Jae Hyun Park, Yongin-si (KR); Young Ho Ryu, Yongin-si (KR); Sang Wook Kwon, Seongnam-si (KR); Ki Young Kim, Yongin-si (KR); Yun Kwon Park, Dongducheon-si (KR); Keum Su Song, Seoul (KR); Chi Hyung Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 563 days.

(21) Appl. No.: 14/025,062

(22) Filed: Sep. 12, 2013

(65) Prior Publication Data

US 2014/0077614 A1     Mar. 20, 2014

(30) Foreign Application Priority Data

Sep. 12, 2012   (KR) .................. 10-2012-0100866
Aug. 7, 2013   (KR) .................. 10-2013-0093654

(51) Int. Cl.
| | |
|---|---|
| *H01F 37/00* | (2006.01) |
| *H01F 27/42* | (2006.01) |
| *H01F 38/00* | (2006.01) |
| *H01F 38/14* | (2006.01) |
| *H02J 5/00* | (2016.01) |

(52) U.S. Cl.
CPC ............... *H01F 38/14* (2013.01); *H02J 5/005* (2013.01)

(58) Field of Classification Search
CPC ...... H01F 38/14; H01F 27/2823; H01F 27/24; H01F 5/02; H01F 27/365; H01F 5/00; H01F 2027/406; H01F 2038/143; H01F 27/16; H01F 27/266; H01F 27/346; H01F 27/367; H01F 27/38; H01F 7/1827; H01F 7/01
USPC ......................................................... 307/104
See application file for complete search history.

(56) References Cited

U.S. PATENT DOCUMENTS

| | | | | |
|---|---|---|---|---|
| 8,912,687 | B2 * | 12/2014 | Kesler .................. | B60L 11/182 307/10.1 |
| 9,148,201 | B2 * | 9/2015 | Kallal .................... | H02J 5/005 |
| 9,191,075 | B2 * | 11/2015 | Jung ..................... | H04B 5/0037 |

(Continued)

FOREIGN PATENT DOCUMENTS

KR    10-2012-0033756 A    4/2012

*Primary Examiner* — Jared Fureman
*Assistant Examiner* — Esayas Yeshaw
(74) *Attorney, Agent, or Firm* — NSIP Law

(57) ABSTRACT

An apparatus and a method for receiving power wirelessly, and an apparatus and a method for transmitting power wirelessly are provided. The apparatus for transmitting power wirelessly includes: a source resonator configured to transmit power wirelessly to a target resonator through a mutual resonance with the target resonator; a power supply unit configured to supply power to the source resonator; and a matching unit configured to connect a passive device to the power supply unit in series or in parallel to match an output impedance of the power supply unit and an input impedance of the source resonator.

20 Claims, 28 Drawing Sheets

(56) References Cited

U.S. PATENT DOCUMENTS

| | | | |
|---|---|---|---|
| 2005/0063488 A1* | 3/2005 | Troyk | G06K 7/0008 375/316 |
| 2007/0222542 A1 | 9/2007 | Joannopoulos et al. | |
| 2009/0243397 A1 | 10/2009 | Cook et al. | |
| 2010/0184371 A1 | 7/2010 | Cook et al. | |
| 2011/0065398 A1 | 3/2011 | Liu et al. | |
| 2011/0234012 A1 | 9/2011 | Yi et al. | |
| 2011/0241440 A1 | 10/2011 | Sakoda et al. | |
| 2012/0153894 A1* | 6/2012 | Widmer | H04B 5/0037 320/108 |
| 2012/0173031 A1* | 7/2012 | Parameswaran | H02J 7/35 700/295 |
| 2012/0286582 A1* | 11/2012 | Kim | H02J 5/005 307/104 |
| 2012/0306286 A1* | 12/2012 | Kim | B60L 11/182 307/104 |
| 2013/0038402 A1* | 2/2013 | Karalis | H02J 5/005 333/32 |
| 2014/0184149 A1* | 7/2014 | Jung | H04B 5/0093 320/108 |
| 2015/0028691 A1* | 1/2015 | Yamauchi | H02J 5/005 307/104 |

* cited by examiner

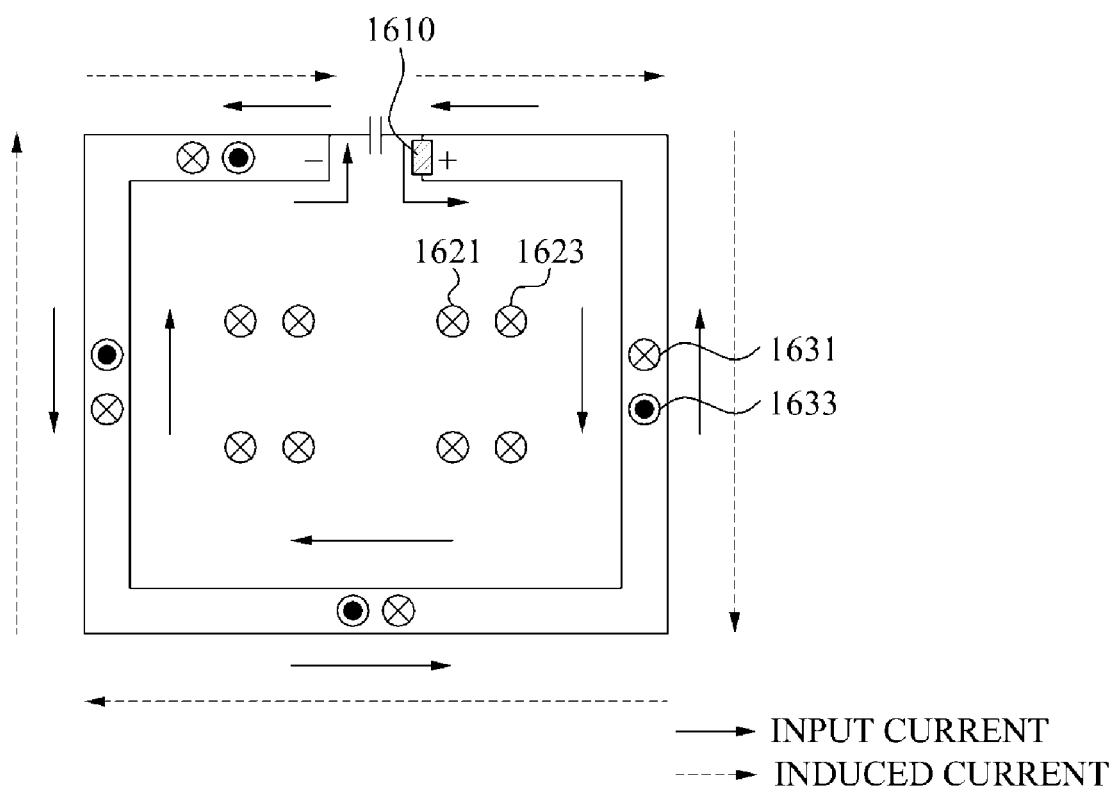

APPARATUS AND METHOD FOR WIRELESS POWER RECEPTION, APPARATUS AND METHOD FOR WIRELESS POWER TRANSMISSION, AND WIRELESS POWER TRANSMISSION SYSTEM

CROSS-REFERENCE TO RELATED APPLICATION(S)

This application claims the benefit under 35 USC §119(a) of Korean Patent Application No. 10-2012-0100866, filed on Sep. 12, 2012, and Korean Patent Application No. 10-2013-0093654, filed on Aug. 7, 2013, in the Korean Intellectual Property Office, the entire disclosures of all of which are incorporated herein by reference for all purposes.

BACKGROUND

1. Field

The following description relates to an apparatus and a method for receiving power wirelessly, and an apparatus and method for transmitting power wirelessly.

2. Description of Related Art

The explosive increase in the use of electronic devices has spurred research on wireless power transmission technology to address the inconvenience of providing wired power supplies to electronic devices, and the limited capacity of conventional batteries used in electronic devices. Examples of electronic devices that may benefit from such technology includes electric vehicles, mobile devices, and the like. One of the wireless power transmission technologies under research focuses on using resonance characteristics of radio frequency (RF) devices in order to transmit power wirelessly.

SUMMARY

In one general aspect, there is provided an apparatus for transmitting power wirelessly, the apparatus including: a source resonator configured to transmit power wirelessly to a target resonator; a power supply unit configured to supply power to the source resonator; and a matching unit configured to connect a passive device to the power supply unit in series or in parallel to match an output impedance of the power supply unit and an input impedance of the source resonator.

The matching unit may be configured to connect the passive device to the power supply unit in series or in parallel based on a characteristic of the power supply unit.

The power supply unit may include a class-E power amplifier.

The passive device may include a capacitor configured to store a capacitance for removing an inductance of the power supply unit.

The capacitor may be configured to store the capacitance expressed by the following equation:

$$C_{fn} = 1/((2\pi f)^2 * L_{fn}),$$

wherein $C_{fn}$ denotes the capacitance of the capacitor, $L_{fn}$ denotes the inductance, and f denotes a resonant frequency.

The power supply unit may include: an alternating current-to-direct current (AC/DC) converter configured to convert an AC voltage from a power supply into a DC voltage; and a power amplifier (PA) configured to convert the converted DC voltage into an AC voltage using a resonant frequency, and to amplify the converted AC voltage.

The matching unit may be configured to: connect the passive device to the power supply unit in series based on a characteristic of the power supply unit to convert an input impedance characteristic of the source resonator to an input impedance characteristic of a parallel resonator; or connect the passive device to the power supply unit in parallel based on the characteristic of the power supply unit to convert the input impedance characteristic of the source resonator to an input impedance characteristic of a series resonator.

The general aspect of the apparatus may further include a transmission controller configured to determine an initial wireless power to be transmitted based on a change in a temperature of the apparatus, a battery state of a target device, a change in an amount of power received at the target device, or a change in a temperature of the target device.

In another general aspect, there is provided an apparatus for receiving power wirelessly, the apparatus including: a target resonator configured to receive power wirelessly from a source resonator; a power converter configured to convert the received power into a form and a level that corresponds to a load; and a matching unit configured to connect a passive device to the power converter in series or in parallel to match an input impedance of the power converter and an output impedance of the target resonator.

The passive device may include a capacitor configured to store a capacitance for removing an inductance of the power converter.

The capacitor may be configured to store the capacitance expressed by the following equation:

$$1/(4*(2\pi f)^2 * L_{fn}) \leq C_{fn} \leq 4/((2\pi f)^2 * L_{fn}),$$

wherein $C_{fn}$ denotes the capacitance of the capacitor, $L_{fn}$ denotes the inductance, and f denotes a resonant frequency.

The power converter may include: a rectification unit configured to convert an alternating current (AC) voltage induced in the target resonator into a direct current (DC) voltage; and a DC-to-DC (DC/DC) converter configured to convert an amplitude of the converted DC voltage into a DC voltage having an amplitude corresponding to the load.

The matching unit is configured to: connect a passive device to the power converter in series to convert an output impedance characteristic of the target resonator to an output impedance characteristic of a parallel resonator; or connect the passive device to the power converter in parallel to convert the output impedance characteristic of the target resonator to an output impedance characteristic of a series resonator.

The general aspect of the apparatus may further include a reception controller configured to adjust an impedance of the target resonator to modulate a signal to be transmitted to a source device that is configured to supply power through the source resonator.

In another general aspect, there is provided a method of transmitting power wirelessly, the method involving: supplying power from a power supply unit to a source resonator; connecting a passive device to the power supply unit in series or in parallel to match an output impedance of the power supply unit and an input impedance of the source resonator; and transmitting power wirelessly to a target resonator through a mutual resonance between the source resonator and the target resonator.

The connecting of the passive device to the power supply unit in series or in parallel may be performed based on a characteristic of the power supply unit.

The power supply unit may include a class-E power amplifier.

The general aspect of the method may further involve: determining a compatibility between the source resonator and another target resonator, based on a difference between a first power link performance index between the source resonator and the target resonator and a second power link performance index between the source resonator and the other target resonator.

The determining may involve determining that the compatibility between the source resonator and the other target resonator is maintained in response to the difference being within a range of 30%.

In another general aspect, there is provided a method of receiving power wirelessly, the method involving: connecting a passive device to a power converter in series or in parallel to match an input impedance of the power converter and an output impedance of a target resonator; receiving power wirelessly from a source resonator through a mutual resonance between the target resonator and the source resonator; and converting the received power into a form and a level that corresponds to a load.

In yet another general aspect, there is provided a wireless power transmission system, including: a wireless power transmission apparatus configured to connect, based on a characteristic of the power supply unit, a first passive device to a power supply unit to match an output impedance of the power supply unit and an input impedance of a source resonator, and transmit power wirelessly to a target resonator through a mutual resonance between the source resonator and the target resonator; and a wireless power reception apparatus configured to connect, based on the characteristic of the power supply unit, a second passive device to a power converter to match an input impedance of the power converter and an output impedance of the target resonator, and receive power wirelessly from the source resonator through the mutual resonance.

The wireless power transmission apparatus may include: the source resonator configured to transmit power wirelessly to the target resonator through the mutual resonance; the power supply unit configured to supply power to the source resonator; and a first matching unit configured to connect, based on the characteristic of the power supply unit, a first capacitor to the power supply unit to match the output impedance of the power supply unit and the input impedance of the source resonator.

The wireless power reception apparatus may include: the target resonator configured to receive power wirelessly from the source resonator; the power converter configured to convert the received power into a form and a level required for a load; and a second matching unit configured to connect, based on the characteristic of the power supply unit, a second capacitor to the power converter to match the input impedance of the power converter and the output impedance of the target resonator.

The first matching unit may be configured to connect the first capacitor to the power supply unit in series to match the output impedance of the power supply unit and the input impedance of the source resonator, and the second matching unit may be configured to connect the second capacitor and the power converter in series to match the input impedance of the power converter and the output impedance of the target resonator.

The first matching unit may be configured to connect the first capacitor to the power supply unit in parallel to match the output impedance of the power supply unit and the input impedance of the source resonator, and the second matching unit may be configured to connect the second capacitor and the power converter in parallel to match the input impedance of the power converter and the output impedance of the target resonator.

The first matching unit may be configured to connect the first capacitor to the power supply unit in parallel to match the output impedance of the power supply unit and the input impedance of the source resonator, and the second matching unit may be configured to connect the second capacitor and the power converter in series to match the input impedance of the power converter and the output impedance of the target resonator.

The first matching unit may be configured to connect the first capacitor to the power supply unit in series to match the output impedance of the power supply unit and the input impedance of the source resonator, and the second matching unit may be configured to connect the second capacitor and the power converter in parallel to match the input impedance of the power converter and the output impedance of the target resonator.

The first matching unit may be configured to connect the first capacitor to the power supply unit in series to convert an input impedance characteristic of the source resonator to an input impedance characteristic of a parallel resonator, or connect the first capacitor to the power supply unit in parallel to convert the input impedance characteristic of the source resonator to an input impedance characteristic of a series resonator, and the second matching unit may be configured to connect the second capacitor to the power converter in series to convert an output impedance characteristic of the target resonator to an output impedance characteristic of a parallel resonator, or connect the second capacitor to the power converter in parallel to convert the output impedance characteristic of the target resonator to an output impedance characteristic of a series resonator.

Other features and aspects will be apparent from the following detailed description, the drawings, and the claims.

BRIEF DESCRIPTION OF THE DRAWINGS

FIG. 16A is a diagram illustrating an example of a distribution of a magnetic field within a resonator based on feeding of a feeder.

Figure 1:
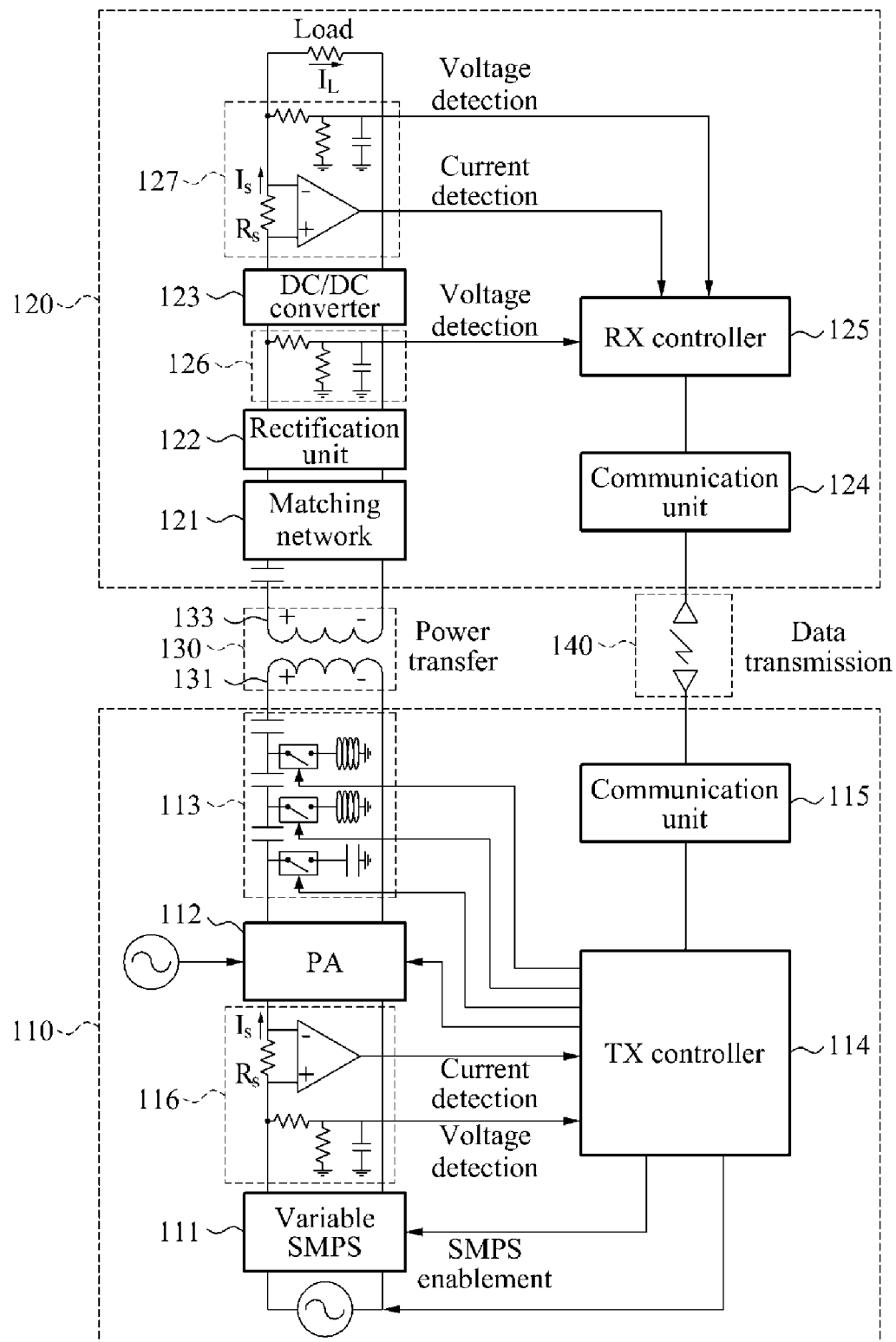
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A wireless power transmission system may be implemented by utilizing resonance characteristics of radio frequency (RF) devices. Such a wireless power transmission system may include a source that is configured to supply power, and a target that is configured to receive the power supplied by the source.

A scheme of performing a wireless communication between a source and a target may include an in-band communication scheme, and an out-band communication scheme. An in-band communication scheme refers to a communication performed between a source and a target in the same frequency band as that used for the power transmission. An out-band communication scheme refers to a communication performed between a source and a target in a separate frequency band that is different from the frequency band used for the transmission of power between the source and the target.

FIG. 1 illustrates an example of a wireless power transmission system that includes a source and a target.

Referring to FIG. 1, the wireless power transmission system includes a source 110 and a target 120. The source 110 may refer to a device that is configured to supply power wirelessly. The source 110 may be implemented as all types of electronic devices that enable supplying power wireless, such as, for example, a pad, a terminal, a television (TV), a medical device, an electric vehicle, and the like. The target 120 may refer to a device that is configured to receive the power supplied wirelessly from the source 110. The target 120 may be implemented in the form of all types of electronic devices that requires power, such as, for example, a pad, a terminal, a tablet personal computer (PC), a medical device, an electric vehicle, and the like.

Referring to FIG. 1, the source 110 includes a variable switching mode power supply (SMPS) 111, a power amplifier (PA) 112, a matching network 113, a transmission (TX) controller 114 (for example, a TX control logic), and a communication unit 115.

The variable SMPS 111 may generate direct current (DC) voltage by switching alternating current (AC) voltage in a band of tens of hertz (Hz) output from a power supply. The variable SMPS 111 may output DC voltage of a predetermined level, or may adjust an output level of DC voltage based on the control of the TX controller 114.

The variable SMPS 111 may control supplied voltage based on a level of power output from the PA 112 so that the PA 112 may operate in a saturation region with high efficiency at all times, and may maintain a maximum efficiency at all levels of desired output power. In one example, the PA 112 may be a class-E power amplifier, or may exhibits features of a class-E amplifier.

In the event that a common SMPS is used instead of the variable SMPS 111, a variable DC-to-DC (DC/DC) converter is additionally used. In this example, the common SMPS and the variable DC/DC converter may control supplied voltage based on the level of the power output from the PA 112 so that the PA 112 may operate in the saturation region with high efficiency at all times, and may maintain the maximum efficiency at all levels of output power.

A power detector 116 may detect output current and output voltage of the variable SMPS 111, and may transfer to the TX controller 114 information regarding the detected current and the detected voltage. Additionally, the power detector 116 may detect input current and input voltage of the PA 112.

The PA 112 may generate power by converting DC voltage of a predetermined level to AC voltage, using a switching pulse signal in a band in a range of a few megahertz (MHz) to tens of MHz. Accordingly, the PA 112 may convert DC voltage supplied to the PA 112 to AC voltage, using a reference resonant frequency $F_{Ref}$, and may generate communication power used for communication, or charging power used for charging the target 120. The communication power and the charging power may be send to and used in a plurality of target devices.

The term "communication power" may refer to power suitable for communication purposes, and the communication power may correspond to low power in a range of 0.1 milliwatt (mW) to 1 mW. The term "charging power" may refer to power suitable for charging a target device, and the charging power may correspond to high power in a range of 1 mW to 200 W that may be consumed in a device load of a target device. In various examples described herein, the term "charging" may refer to supplying power to a unit or element that is configured to store power for subsequent consumption. The term "charging" may also refer to supplying power to a unit or element that is configured to consume power. The units or elements that may be charged include, for example, batteries, displays, sound output circuits, main processors, various sensors, and the like.

The term "reference resonant frequency" may refer to a resonant frequency that is used by the source 110. The term "tracking frequency" may refer to a resonant frequency that is adjusted by a preset scheme.

The TX controller 114 may be configured to detect a reflected wave of the communication power or the charging power, and may be configured to detect a mismatching that may occur between a target resonator 133 and a source resonator 131 based on the detected reflected wave. To detect the mismatching between a source resonator 131 and a target resonator 133, the TX controller 114 may, for example, detect an envelope of the reflected wave, a power amount of the reflected wave, and the like.

Under the control of the TX controller 114, the matching network 113 may compensate for impedance mismatching between the source resonator 131 and the target resonator 133 in order to optimize the matching between the source resonator 131 and the target resonator. Referring to FIG. 1, the matching network 113 may be connected with a switch, based on a combination of a capacitor and an inductor, which are under the control of the TX controller 114.

The TX controller 114 may compute a voltage standing wave ratio (VSWR) based on a voltage level of the reflected wave and on a level of an output voltage of the source resonator 131 or the PA 112. In the event that the VSWR is greater than a predetermined value, the TX controller 114 may determine that a mismatching has occurred.

In another example, in the event that the VSWR is determined to be greater than the predetermined value, the TX controller 114 may compute power transmission efficiency for each of N tracking frequencies, and may determine a tracking frequency $F_{Best}$ with the best power transmission efficiency among the N tracking frequencies. Based on the result, the TX controller 114 may adjust the reference resonant frequency $F_{Ref}$ to the tracking frequency $F_{Best}$. In various examples, the N tracking frequencies may be set in advance.

The TX controller 114 may adjust a frequency of a switching pulse signal. The frequency of the switching pulse signal may be determined by the TX controller 114. For example, by controlling the PA 112, the TX controller 114 may generate a modulation signal that may be transmitted to the target 120. For example, the communication unit 115 may transmit a variety of data 140 to the target 120 using an in-band communication. The TX controller 114 may detect a reflected wave, and may demodulate a signal received from the target 120 through an envelope of the detected reflected wave.

The TX controller 114 may generate a modulation signal for in-band communication, using various methods. For example, the TX controller 114 may generate the modulation signal by turning on or off a switching pulse signal, by performing delta-sigma modulation, and the like. The TX controller 114 may also generate a pulse-width modulation (PWM) signal with a predetermined envelope.

The TX controller 114 may determine initial wireless power that is to be transmitted to the target 120. The TX controller 114 may determine the initial wireless power to be transmitted based on: a change in a temperature of the source 110, a battery state of the target 120, a change in an amount of power received at the target 120, and/or a change in a temperature of the target 120.

The source 110 may further include a temperature measurement sensor (not illustrated) that is configured to detect a change in temperature of the source 110. The source 110 may receive, from the target 120, information regarding the battery state of the target 120, the change in the amount of power received at the target 120, and/or the change in the temperature of the target 120, by communicating with the target 120.

The change in the temperature of the target 120 may be detected based on data received from the target 120.

The TX controller 114 may adjust voltage supplied to the PA 112, using a lookup table. The lookup table may be used to store an amount of the voltage to be adjusted based on the change in the temperature of the source 110. For example, in response to determining that the temperature of the source 110 increased, the TX controller 114 may lower the amount of the voltage to be supplied to the PA 112 based on the lookup table.

The communication unit 115 may perform an out-band communication that employs a communication channel. The communication unit 115 may include a communication module, such as one configured to process ZigBee, Bluetooth, and the like. The communication unit 115 may transmit data 140 to the target 120 through an out-band communication.

The source resonator 131 may transfer an electromagnetic energy 130 to the target resonator 133. For example, the source resonator 131 may transfer the communication power or charging power to the target 120, using magnetic coupling with the target resonator 133.

As illustrated in FIG. 1, the target 120 includes a matching network 121, a rectification unit 122, a DC/DC converter 123, a communication unit 124, and a reception (RX) controller 125 (for example, an RX control logic).

The target resonator 133 may receive electromagnetic energy 130 from the source resonator 131. For example, the target resonator 133 may receive communication power or charging power from the source 110, using magnetic coupling with the source resonator 131. Additionally, the target resonator 133 may receive data 140 from the source 110 using an in-band communication.

The target resonator 133 may receive the initial wireless power that is determined based on the change in the temperature of the source 110, the battery state of the target 120, the change in the amount of power received at the target 120, and/or the change in the temperature of the target 120.

The matching network 121 may match an input impedance viewed from the source 110 to an output impedance viewed from a load. The matching network 121 may be configured with a combination of a capacitor and an inductor.

The rectification unit 122 may generate DC voltage by rectifying AC voltage. The AC voltage may be received from the target resonator 133.

The DC/DC converter 123 may adjust a level of the DC voltage that is output from the rectification unit 122, based on a capacity required by the load. For an example, the DC/DC converter 123 may adjust the level of the DC voltage output from the rectification unit 122 from 3 volts (V) to 10 V.

The power detector 127 may detect voltage of an input terminal 126 of the DC/DC converter 123, and current and voltage of an output terminal of the DC/DC converter 123. The detected voltage of the input terminal 126 may be used to compute a transmission efficiency of power received from the source 110. The detected current and the detected voltage of the output terminal may be also used by the RX controller 125 to compute an amount of power transferred to the load. The TX controller 114 of the source 110 may determine an amount of power that needs to be transmitted by the source 110, based on power required by the load and the power transferred to the load.

When the amount of power of the output terminal computed using the communication unit 124 is transferred to the source 110, the source 110 may compute an amount of power that needs to be transmitted.

The communication unit 124 may perform an in-band communication to transmit or receive data using a resonance frequency. During the in-band communication, the RX controller 125 may demodulate a received signal by detecting a signal between the target resonator 133 and the rectification unit 122, or detecting an output signal of the rectification unit 122. For example, the RX controller 125 may demodulate a message received using an in-band communication. The RX controller 125 may also adjust an impedance of the target resonator 133 using the matching network 121, to modulate a signal to be transmitted to the source 110. For example, the RX controller 125 may increase the impedance of the target resonator 133, so that a reflected wave may be detected from the TX controller 114 of the source 110. Depending on whether the reflected wave is detected, the TX controller 114 may detect a first value, for example a binary number "0," or a second value, for example a binary number "1."

The communication unit 124 may transmit a response message to the communication unit 115 of the source 110. For example, the response message may include one or more of: a type of a corresponding target, information about a manufacturer of the corresponding target, a model name of the corresponding target, a battery type of the corresponding target, a scheme for charging the corresponding target, an impedance value of a load of the corresponding target, information on characteristics of a target resonator of the corresponding target, information on a frequency band used by the corresponding target, an amount of a power consumed by the corresponding target, an identifier (ID) of the corresponding target, information on version or standard of the corresponding target, and the like.

The communication unit 124 may perform an out-band communication that utilizes a separate communication channel. For example, the communication unit 124 may include a communication module, such as one configured to process ZigBee, Bluetooth, and the like. The communication unit 124 may transmit or receive data 140 to or from the source 110 using the out-band communication.

The communication unit 124 may receive a wake-up request message from the source 110, and the power detector 127 may detect an amount of power received to the target resonator 133. The communication unit 124 may transmit, to the source 110, information on the detected amount of the power. Information on the detected amount may include, for example, an input voltage value and an input current value of the rectification unit 122, an output voltage value and an output current value of the rectification unit 122, an output voltage value and an output current value of the DC/DC converter 123, and the like.

A wireless power transmission efficiency is a factor affecting energy conservation and a service life of a device according to a degradation of the device, and also a significant factor for commercialization of wireless power transmission devices. The overall efficiency of wireless power transmission may be determined based on several categories of efficiencies, including an efficiency at an RX end, an efficiency at a TX end, an efficiency of impedance matching between the TX end and the RX end, and an efficiency of transmission between a source resonator and a target resonator. When the efficiency at the RX end, the efficiency at the TX end, and the efficiency of transmission between the source resonator and the target resonator are designed to be maximized in wireless power transmission, the overall efficiency may be determined based on a configuration of a matching network used to perform the power transmission between the source resonator and the target resonator.

In a wireless power transmission system, when a demanded amount of power for a wireless power transmission apparatus is abruptly changed to a significant degree due to a change in a number of target resonators or a load at the RX end, a mismatching between an output impedance of the RX end and an input impedance of the TX end may occur. When such a mismatching occurs, the efficiency of the wireless power transmission system may decline considerably.

Figure 2:
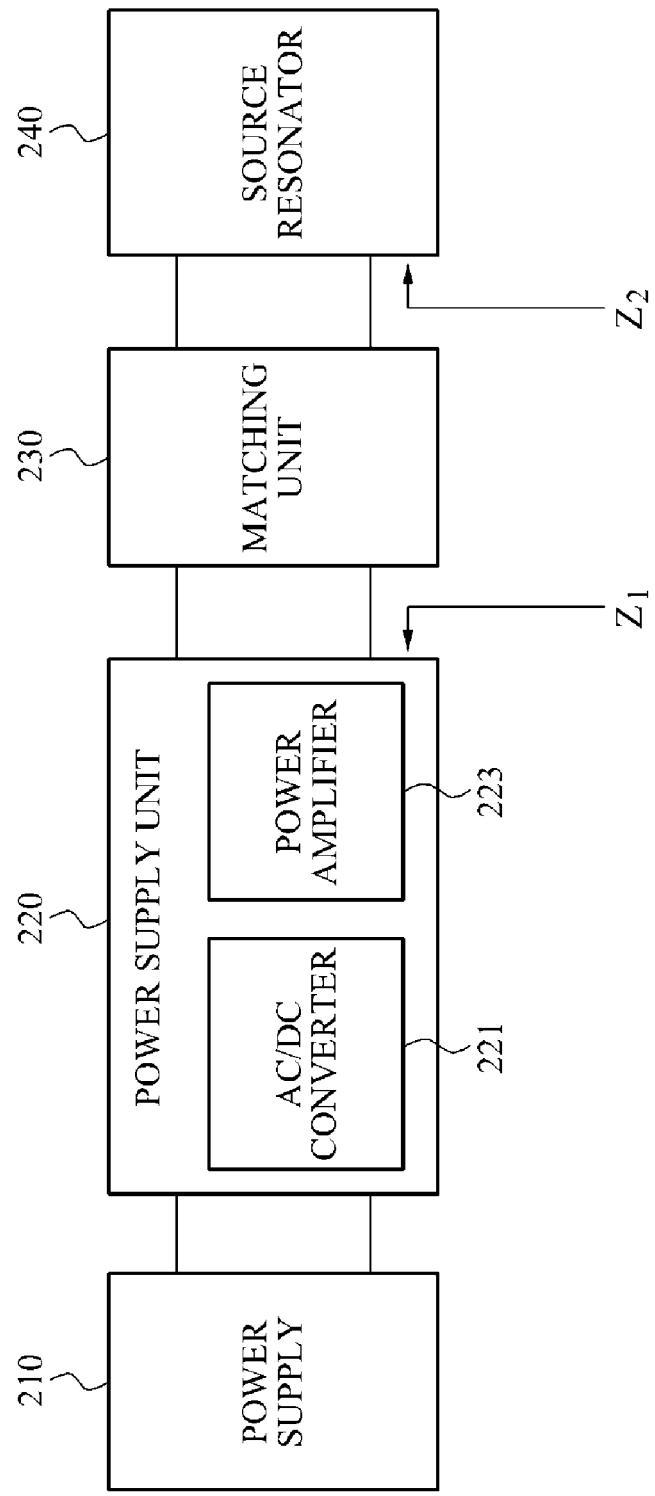
FIG. 2 is a block diagram illustrating an example of a wireless power transmission apparatus.

FIG. 2 illustrates an example of a wireless power transmission apparatus.

Referring to FIG. 2, the wireless power transmission apparatus include a power supply unit 220, a matching unit 230, and a source resonator 240.

The power supply unit 220 may supply power to the source resonator 240. The power supply unit 220 may receive power supplied from a power supply 210. In this example, the supplied power may correspond to AC power or DC power. Although the power supply 210 is provided as a separate component from the power supply unit 220 in FIG. 2, in other examples, the power supply 210 may also be included in the power supply unit 220.

Referring to FIG. 2, the power supply unit 220 includes an AC-to-DC (AC/DC) converter 221, and a PA 223.

The AC/DC converter 221 may convert an AC voltage output from the power supply 210 into a DC voltage. For instance, the AC/DC converter 221 may operate as an analog to digital converter (ADC).

The PA 223 may convert the DC voltage converted by the AC/DC converter 221 into an AC voltage using a resonant frequency, and amplify an amplitude of the converted AC voltage. In this example, the resonant frequency may refer to a frequency at which a mutual resonance between the source resonator 240 and a target resonator occurs. The PA 223 may amplify the amplitude of the AC voltage based on energy transmission efficiency.

Based on a characteristic of the power supply unit 220, the matching unit 230 may connect a passive device to the power supply unit 220 in series or parallel to match an output impedance $Z_1$ of the power supply unit 220 with an input impedance $Z_2$ of the source resonator 240. For instance, the passive device may be connected in series to the power supply unit 220. In another instance, the passive device may be connected in parallel to the power supply unit 220. That is, the passive device may be connected in series or parallel to the PA 223.

The characteristic of the power supply unit 220 may indicate whether the output impedance increases or decreases as an amount of power output from the power supply unit 220 increases. Conversely, the characteristic of the power supply unit 220 may indicate whether the output impedance decreases or increases as the amount of the power output from the power supply unit 220 decreases.

For example, when a number of wireless power reception apparatuses increases, an amount of power to be output from the power supply unit 220 may increase. When a load in a single wireless power reception apparatus increases, an amount of power to be output from the power supply unit 220 may decrease.

In this example, when the characteristic of the power supply unit 220 corresponds to a state in which the output impedance increases as an amount of power to be output increases, the input impedance of the source resonator 240 may be increased to achieve matching between the output impedance and the input impedance. In this instance, the passive device may be connected in series or in parallel to the power supply unit 220 so that the input impedance of the source resonator 240 may increase.

Figure 3:
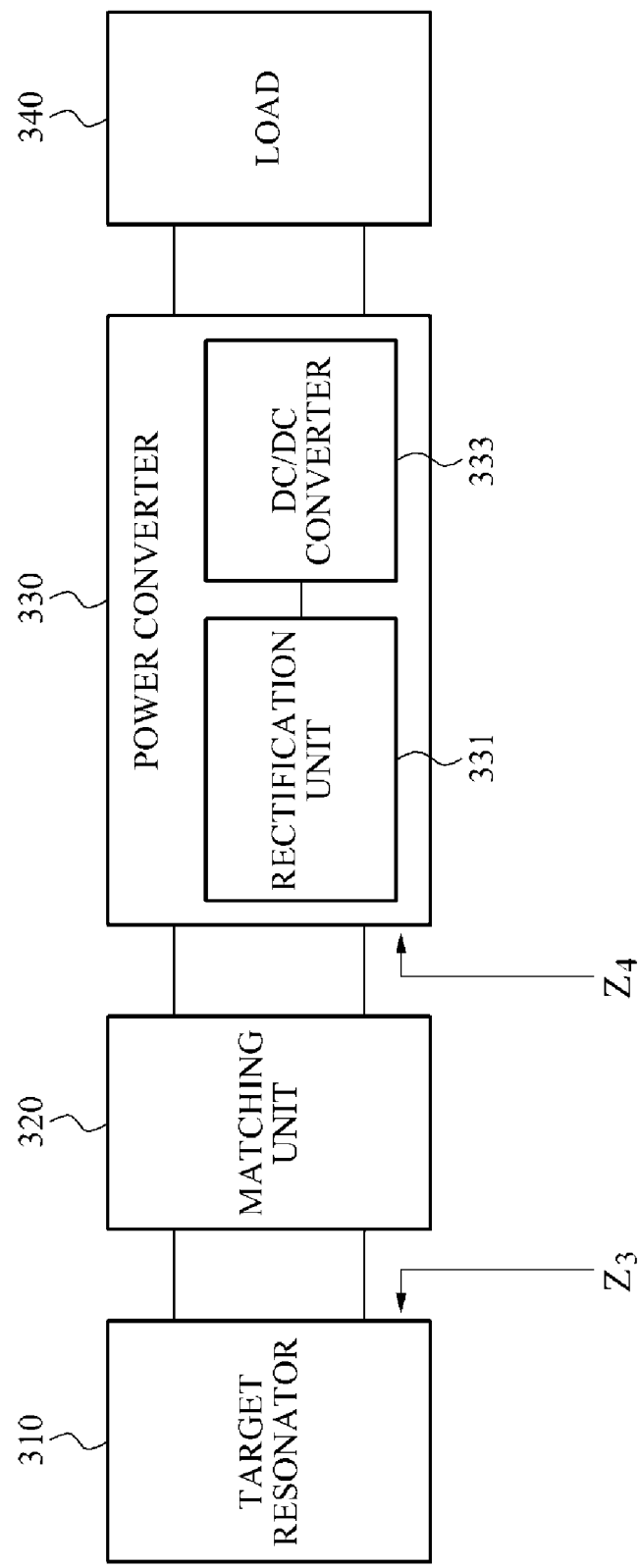
FIG. 3 is a block diagram illustrating an example of a wireless power reception apparatus.

Whether the passive device is to be connected to the power supply unit 220 in parallel or in series may be determined based on whether a passive device is connected to a power converter 330 of FIG. 3 in parallel or in series. An example will be described further with reference to FIG. 4.

For example, in the event that the PA is a class-E PA, an output impedance of the PA may increase as an amount of output power increases, and the output impedance of the PA may decrease as the amount of output power decreases. Thus, when a number of wireless power reception apparatuses increases, the output impedance of the PA also increases. When a load in a single wireless power reception apparatus increases, the output impedance of the PA decreases.

In addition, when the output impedance of the PA increases, the passive device is to be connected in series or parallel to the PA so that the input impedance of the source resonator 240 may increase. When the output impedance of the PA decreases, the passive device may be connected in series or parallel to the PA so that the input impedance of the source resonator 240 may decrease. A relationship between a manner of connecting the passive device to the PA and the input impedance of the source resonator 240 will be described further with reference to Table 1 and FIG. 4.

In this example, the passive device may include a capacitor configured to store a capacitance sufficient for cancelling or removing an inductance of the power supply unit 220. The capacitance of the capacitor may be determined to be a capacitance required for removing the inductance of the power supply unit 220.

For example, the capacitor may be determined to have a value expressed by Equation 1.

$$C_{fn}=1/((2\pi f)^2 *L_{fn})$$ [Equation 1]

In Equation 1, $C_{fn}$ denotes the capacitance of the capacitor, $L_{fn}$ denotes the inductance of the power supply unit 220, and f denotes a resonant frequency.

As another example, the capacitor may be determined to have a value expressed by Equation 2.

$$1/(4*(2\pi f)^2 *L_{fn}) \leq C_{fn} \leq 4/((2\pi f)^2 *L_{fn})$$ [Equation 2]

In Equation 2, $C_{fn}$ denotes the capacitance of the capacitor, $L_{fn}$ denotes the inductance of the power supply unit 220, and f denotes a resonant frequency.

The source resonator 240 may be configured to transmit power wirelessly to the target resonator through a mutual resonance with the target resonator.

FIG. 3 illustrates an example of a wireless power reception apparatus.

Referring to FIG. 3, the wireless power reception apparatus includes a target resonator 310, a matching unit 320, and the power converter 330.

The target resonator 310 may receive power wirelessly from a source resonator through a mutual resonance with the source resonator. When a resonant frequency of the target resonator 310 matches a resonant frequency of the source resonator, the power may be transferred from the source resonator to the target resonator 310 through the mutual resonance.

The matching unit 320 may connect a passive device to the power converter 330 in series or in parallel in order to match an input impedance $Z_4$ of the power converter 330 and an output impedance $Z_3$ of the target resonator 310 to each other.

Whether the passive device is to be connected to the power converter 330 in parallel or in series may be determined in association with whether a passive device is connected to the power supply unit 220 of FIG. 2 in parallel or series. An example thereof will be further described with reference to FIG. 4.

In this example, when an output impedance of the power supply unit 220 of FIG. 2 increases, a passive device is to be connected in series or parallel to the power supply unit 220 so that an input impedance of the source resonator 240 of FIG. 2 may increase. A passive device may be connected in parallel or series to the power converter 330 so that the input impedance of the source resonator 240 may increase.

When the output impedance of the power supply unit 220 decreases, the passive device is to be connected in series or parallel to the power supply unit 220 so that the input impedance of the source resonator 240 may decrease. In this instance, the passive device may be connected in parallel or series to the power converter 330 so that the input impedance of the source resonator 240 may decrease.

A relationship between a manner of connecting the passive device to the power supply unit 220 and the input impedance of the source resonator 240 will be described in reference to Table 1 and FIG. 4.

The passive device may include a capacitor configured to store sufficient a capacitance to cancel or remove an inductance of the power converter 330. The capacitance of the capacitor may be determined to be a capacitance required for removing the inductance of the power converter 330.

For example, the capacitor may be determined to have a value expressed by Equation 3.

$$C_{fn}=1/((2\pi f)^2 *L_{fn})$$ [Equation 3]

In Equation 3, $C_{fn}$ denotes the capacitance of the capacitor, $L_{fn}$ denotes the inductance of the power converter 330, and f denotes a resonant frequency.

As another example, the capacitor may be determined to have a value expressed by Equation 4.

$$1/(4*(2\pi f)^2 *L_{fn}) \leq C_{fn} \leq 4/((2\pi f)^2 *L_{fn})$$ [Equation 4]

In Equation 4, $C_{fn}$ denotes the capacitance of the capacitor, $L_{fn}$ denotes the inductance of the power converter 330, and f denotes a resonant frequency.

The power converter 330 may convert the power received by the target resonator 310 into a form and a level required for a load 340.

Referring to FIG. 3, the power converter 330 includes a rectification unit 331, and a DC/DC converter 333.

The rectification unit 331 may convert an AC voltage induced in the target resonator 310 by the source resonator 240 into a DC voltage. The DC/DC converter 333 may convert an amplitude of the converted DC voltage into a DC voltage required for at least one of operating and charging of the load 340. The DC/DC converter 333 may step up or down the amplitude of the DC voltage to a voltage required for a rated voltage of the load 340.

The load 340 may refer to a real-time operating device or a battery that requires energy charging. For example, the real-time operating device may include a television, a stereo system, an automated external defibrillator (AED), and the like. The load 340 may be included as a basic component of the wireless power reception apparatus, or may be provided as a separate component from the wireless power reception apparatus.

Figure 4:
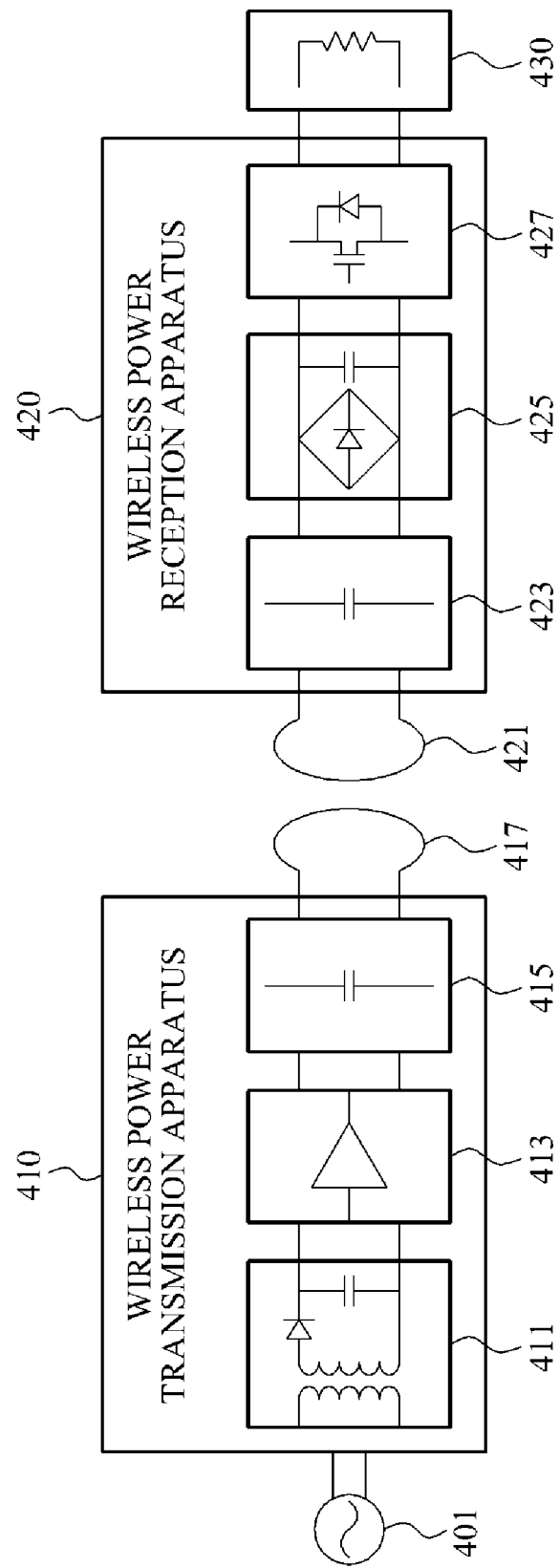
FIG. 4 is a diagram illustrating another example of a wireless power transmission system.

FIG. 4 illustrates another example of a wireless power transmission system.

Referring to FIG. 4, the wireless power transmission system includes a wireless power transmission apparatus 410, and a wireless power reception apparatus 420.

Based on a characteristic of a power supply unit, the wireless power transmission apparatus 410 may connect a first passive device to the power supply unit to match an output impedance of the power supply unit and an input impedance of a source resonator 417. The power supply unit may include an AC/DC converter 411, and a PA 413.

Referring to FIG. 4, the wireless power transmission apparatus 410 includes the AC/DC converter 411, the PA 413, a first matching unit 415, and the source resonator 417. A power supply 401 may provide an AC signal, and also provide a DC signal. The power supply 401 may be mounted as a basic component of the wireless power transmission apparatus 410, or may be provided as a separate component from the wireless power transmission apparatus 410.

The AC/DC converter 411 may convert an AC voltage output from the power supply 401 into a DC voltage.

The PA 413 may convert the DC voltage converted by the AC/DC converter 411 into an AC voltage using a resonant frequency, and amplify an amplitude of the converted AC voltage. The resonant frequency may refer to a frequency at which a mutual resonance between the source resonator 417 and a target resonator 421 occurs. The PA 413 may amplify the amplitude of the AC voltage based on an energy transmission efficiency.

A passive device may include a capacitor configured to store a capacitance sufficient for cancelling or removing an inductance of the power supply unit. The capacitance of the capacitor may be determined to be a capacitance required for removing the inductance of the power supply unit. Also, the passive device may include a capacitor configured to store a capacitance sufficient for removing an inductance of the PA 413.

Based on the characteristic of the power supply unit, the first matching unit 415 may connect a first capacitor to the power supply unit to match the output impedance of the power supply unit and the input impedance of the source resonator 417. The first matching unit 415 may connect the first capacitor to the PA 413 in series or parallel, based on a characteristic of the PA 413. The first matching unit 415 may correspond to the first capacitor connected in series or parallel to the PA 413.

The characteristic of the PA 413 may indicate whether the output impedance increases or decreases as an amount of power output from the PA 413 increases. Conversely, the characteristic of the PA 413 may indicate whether the output impedance decreases or increases as the amount of the power output from the PA 413 decreases.

For example, when a number of wireless power reception apparatuses increases, an amount of power to be output from the PA 413 may increase. When a load in a single wireless power reception apparatus increases, an amount of power to be output from the PA 413 may decrease.

In this instance, when the characteristic of the PA 413 corresponds to that the output impedance increases as an amount of power to be output increases, the input impedance of the source resonator 417 is increased to achieve matching between the output impedance and the input impedance. Thus, the first capacitor may be connected in series or parallel to the PA 413 so that the input impedance of the source resonator 417 may increase.

The source resonator 417 may transmit power wirelessly to the target resonator 421 through a mutual resonance.

Based on a characteristic of the power supply unit, the wireless power reception apparatus 420 may connect a second passive device to a power converter to match an input impedance of the power converter and an output impedance of the target resonator 421. For example, the power converter may include a rectification unit 425, and a DC/DC converter 427.

The wireless power reception apparatus 420 includes the target resonator 421, a second matching unit 423, the rectification unit 425, and the DC/DC converter 427. A load 430 may be mounted as a basic component of the wireless power reception apparatus 420, or may be provided as a separate component from the wireless power reception apparatus 420.

The target resonator 421 may receive power wirelessly from the source resonator 417 through a mutual resonance.

Based on the characteristic of the power supply unit, the second matching unit 423 may connect a second capacitor to the rectification unit 425 to match an input impedance of the rectification unit 425 and the output impedance of the target resonator 421. For example, the second matching unit 423 may connect the second capacitor to the rectification unit 425 in series or parallel, based on the characteristic of the PA 413. The second matching unit 423 may correspond to the second capacitor connected in series or parallel to the rectification unit 425.

The rectification unit 425 may convert an AC voltage induced in the target resonator 421 into a DC voltage. The DC/DC converter 427 may convert an amplitude of the DC voltage converted by the rectification unit 425 into a DC voltage required for at least one of operating and charging of the load 430.

For instance, the first matching unit 415 may connect the first capacitor to the PA 413 in series to match the output impedance of the PA 413 and the input impedance of the source resonator 417. The second matching unit 423 may connect the second capacitor to the rectification unit 425 in series to match the input impedance of the rectification unit 425 and the output impedance of the target resonator 421.

Also, the first matching unit 415 may connect the first capacitor to the PA 413 in parallel to match the output impedance of the PA 413 and the input impedance of the source resonator 417. The second matching unit 423 may connect the second capacitor to the rectification unit 425 in parallel to match the input impedance of the rectification unit 425 and the output impedance of the target resonator 421.

The first matching unit 415 may also connect the first capacitor to the PA 413 in parallel to match the output impedance of the PA 413 and the input impedance of the source resonator 417. The second matching unit 423 may connect the second capacitor to the rectification unit 425 in series to match the input impedance of the rectification unit 425 and the output impedance of the target resonator 421.

Also, the first matching unit 415 may connect the first capacitor to the PA 413 in series to match the output impedance of the PA 413 and the input impedance of the source resonator 417. The second matching unit 423 may connect the second capacitor to the rectification unit 425 in parallel to match the input impedance of the rectification unit 425 and the output impedance of the target resonator 421.

The input impedance of the source resonator 417 may change due to: a change in a number of target resonators 421, a change in a position of the target resonator 421 above the source resonator 417 in a case of the wireless power transmission apparatus 410 corresponding to a pad type, a change in a distance between the target resonator 421 and the source resonator 417, a change in the load 430 being charged, and the like.

When the number of target resonators 421 increases, an amount of power output from the PA 413 may need to be increased. In a case in which a single target resonator 421 is provided, when an impedance of the load 430 increases as the load 430 is charged, a decrease in an amount of power output from the PA 413 may be necessary. According to the characteristic of the PA 413, when the amount of the output power increases, the output impedance may increase or decrease. Also, when the amount of the output power decreases, the output impedance may decrease or increase.

For example, in the event that a class-E PA is used as the PA 413, an output impedance of the PA 413 may increase when an amount of output power increases, and the output impedance of the PA 413 may decrease when an amount of output power decreases. Table 1 shows whether an input impedance $Z_{IN}$ of the source resonator 417 increases or decreases in four cases in which the first capacitor and the second capacitor are connected in series or parallel, and in a case in which a load impedance increases, a number of target resonators increases, or a load impedance of any one of provided multiple target resonators increases.

The output impedance of the class-E PA may increase when an amount of output power increases, and the output impedance may decrease when the amount of the output power decreases. Accordingly, when the number of the target resonators 421 increases, the input impedance $Z_{IN}$ is to increase to match the increasing output impedance. When the load impedance increases, the input impedance $Z_{IN}$ is to decrease to match the decreasing output impedance. The foregoing conditions may be satisfied when the first capacitor is connected in parallel and the second capacitor is connected in parallel.

In the event that the PA 413 is implemented with an amplifier that is not a class-E amplifier or having features other than class-E amplifier, the first capacitor may be connected to the PA 413 and the second capacitor may be connected to the rectification unit 425, in other combinations.

Figure 5A:
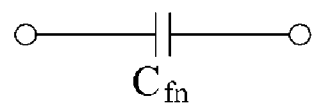
FIGS. 5A and 5B are diagrams illustrating examples of a scheme of connecting a passive device used in a wireless power transmission apparatus with a wireless power reception apparatus.
Figure 5A:
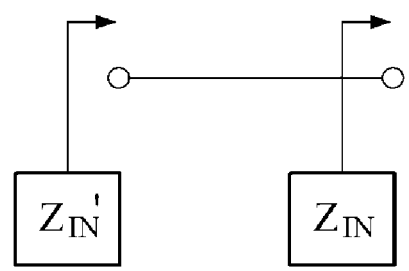
Figure 5B:
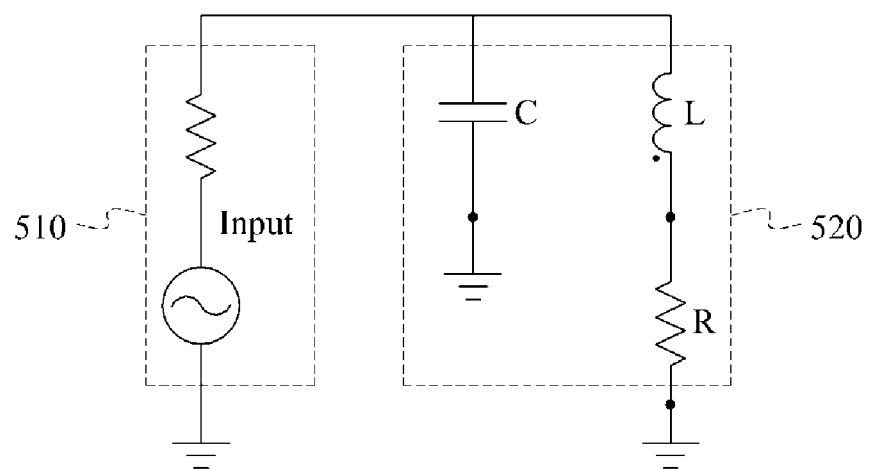

FIGS. 5A and 5B illustrate examples of a scheme of connecting a passive device used in a wireless power transmission apparatus with a wireless power reception apparatus.

Referring to FIG. 5A, a first capacitor $C_{fn}$ is connected in series to the PA 413 and the source resonator 417 of FIG. 4. When the first capacitor $C_{fn}$ is connected in series, an input impedance $Z_{IN}$ of the source resonator 417 may be changed to an input impedance $Z_{IN}'$. In this instance, a value of the first capacitor $C_{fn}$ may be determined to be a value required for removing an inductance of the PA 413. The input impedance $Z_{IN}'$ may be expressed by Equation 5.

$$Z_{IN}' = \text{Re}[Z_{IN}] + \text{Im}[Z_{IN}] + \frac{1}{j\omega C_{fn}} \qquad [\text{Equation 5}]$$

$$Z_{IN}' = \text{Re}[Z_{IN}]$$

A value of the input impedance $Z_{IN}'$ may correspond to a real number obtained by removing an imaginary number portion of the input impedance $Z_{IN}$ and thus, may provide conditions for perfect impedance matching.

Referring to FIG. 5B, a power supply 510 and a source resonator 520 are connected directly to each other. In this example, the source resonator 520 may correspond to a parallel resonator to which a capacitor is connected in parallel. In the wireless power transmission apparatus 410 of FIG. 4, the power supply 401 and the source resonator 417 are not connected directly. In the configuration of FIG. 4, when the first capacitor $C_{fn}$ is connected in series to the source resonator 417, a characteristic of an input impedance of the source resonator 417 may correspond to a characteristic of an input impedance of the source resonator 520 that is provided in a form of a parallel resonator in FIG. 5.

Figure 6A:
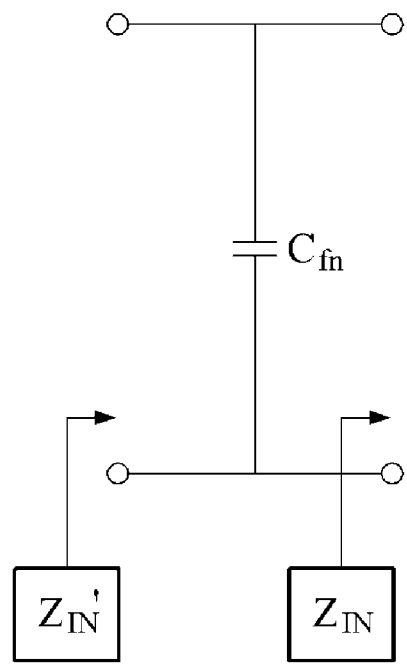
FIGS. 6A and 6B are diagrams illustrating examples of a scheme of connecting a passive device used in a wireless power transmission apparatus with a wireless power reception apparatus.
Figure 6B:
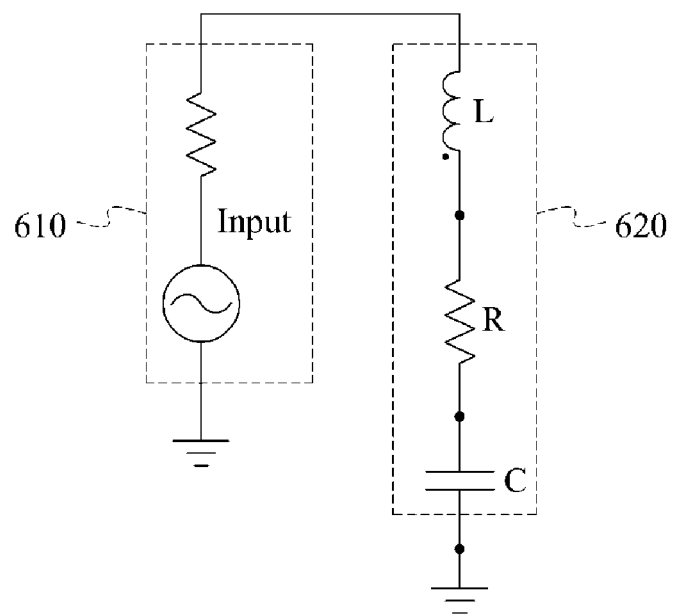

FIGS. 6A and 6B illustrate examples of a scheme of connecting a passive device used in a wireless power transmission apparatus and a wireless power reception apparatus.

TABLE 1

| | Single target resonator, Increase in load impedance | Increase in number of target resonators | Multiple target resonators, Increase in load impedance of $n^{th}$ target resonator |
|---|---|---|---|
| $1^{st}$ capacitor: Series, $2^{nd}$ capacitor: Series | Decrease in $Z_{IN}$ | Decrease in $Z_{IN}$ | Increase in $Z_{IN}$<br>Increase in power distribution rate of $n^{th}$ target resonator |
| $1^{st}$ capacitor: Parallel, $2^{nd}$ capacitor: Parallel | Decrease in $Z_{IN}$ | Increase in $Z_{IN}$ | Decrease in $Z_{IN}$<br>Decrease in power distribution rate of $n^{th}$ target resonator |
| $1^{st}$ capacitor: Parallel, $2^{nd}$ capacitor: Series | Increase in $Z_{IN}$ | Increase in $Z_{IN}$ | Increase in $Z_{IN}$<br>Increase in power distribution rate of $n^{th}$ target resonator |
| $1^{st}$ capacitor: Series, $2^{nd}$ capacitor: Parallel | Increase in $Z_{IN}$ | Decrease in $Z_{IN}$ | Decrease in $Z_{IN}$<br>Decrease in power distribution rate of $n^{th}$ target resonator |

Referring to FIG. 6A, a first capacitor $C_{fn}$ is connected in parallel to the PA 413 and the source resonator 417 of FIG. 4.

When the first capacitor $C_{fn}$ is connected in parallel, an input impedance $Z_{IN}$ of the source resonator 417 may be changed to an input impedance $Z_{IN}'$. In this instance, a value of the first capacitor $C_{fn}$ may be determined to be a value required for removing an inductance of the PA 413. The input impedance $Z_{IN}'$ may be expressed by Equation 6.

$$Z_{IN}' = (Re[Z_{IN}] + Im[Z_{IN}]) \left\| \frac{1}{j\omega C_{fn}} \right. \quad \text{[Equation 6]}$$

$$Z_{IN}' = \frac{(Re[Z_{IN}] + Im[Z_{IN}])\frac{1}{j\omega C_{fn}}}{Re[Z_{IN}] + Im[Z_{IN}] + \frac{1}{j\omega C_{fn}}}$$

Since the original input impedance $Z_{IN}$ is placed in the denominator, a new input impedance $Z_{IN}'$ may be inversely proportional to $Z_{IN}$. For example, by connecting a capacitor to the source resonator 417 in series or parallel, a proportional or inverse proportional relation with the input impedance $Z_{IN}$ may be selected. Accordingly, matching between an output impedance and an input impedance may be achieved based on the characteristic of the PA 413.

Referring to FIG. 6B, a power supply 610 and a source resonator 620 are connected directly. In this example, the source resonator 620 may correspond to a series resonator to which a capacitor is connected in series. In the wireless power transmission apparatus 410 of FIG. 4, the power supply 401 and the source resonator 417 are not connected directly. In the example illustrated in FIG. 4, when the first capacitor $C_{fn}$ is connected in parallel to the source resonator 417, a characteristic of an input impedance of the source resonator 417 may correspond to a characteristic of an input impedance of the source resonator 620 that is provided in a form of a series resonator in FIG. 6B.

Table 2 shows whether an input impedance $Z_{IN}$ of a source resonator increases or decreases in a case in which the source resonator 520 corresponding to a parallel resonator and the target resonator 620 corresponding to a series resonator, as shown in FIGS. 5B and 6B, respectively, are used.

In a case of a class-E PA, an output impedance of the PA may increase when an amount of output power increases, and the output impedance may decrease when the amount of the output power decreases. Accordingly, when a number of target resonators increases, the input impedance $Z_{IN}$ is increased to match the increasing output impedance. When a load impedance increases, the input impedance $Z_{IN}$ is decreased to match the decreasing output impedance. The foregoing conditions may be satisfied when a source resonator corresponds to the series resonator 620 and a target resonator corresponds to the series resonator 620.

In the event that the PA is not a class-E amplifier or has features other than a class-E amplifier, other combinations of a source resonator and a target resonator may be used.

Figure 7:
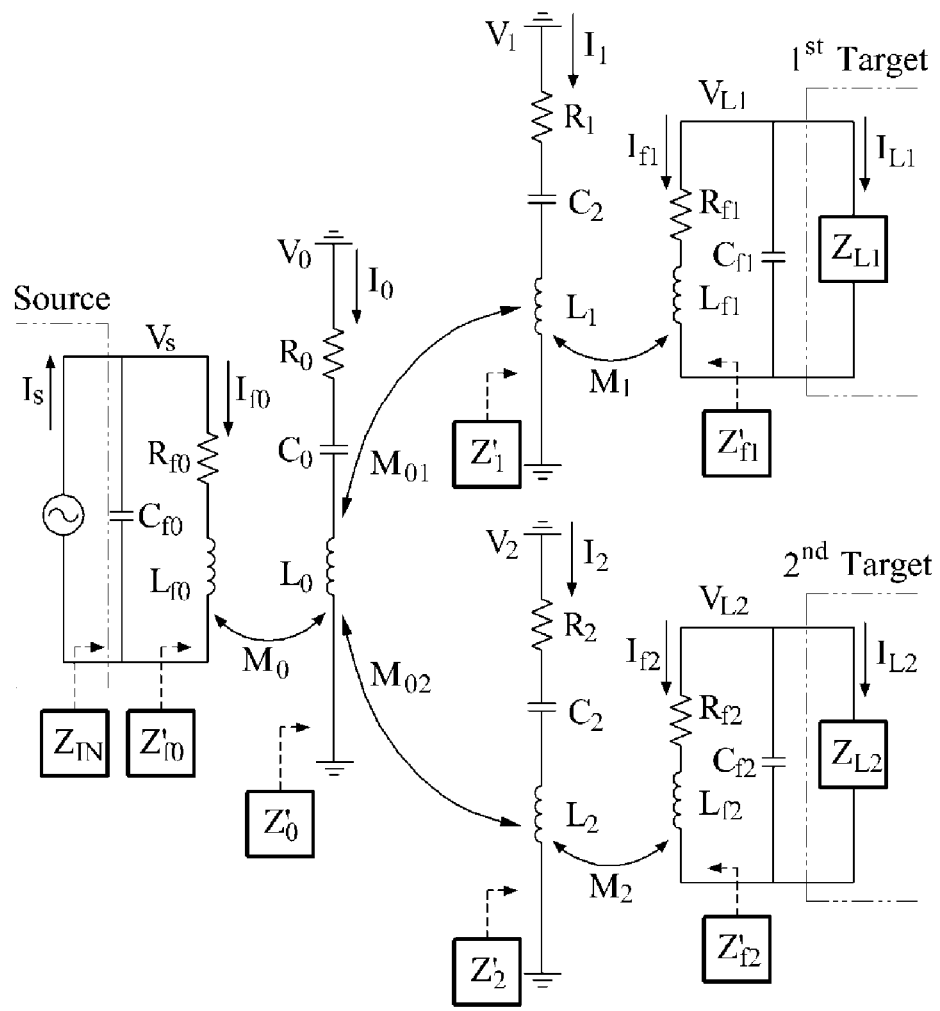
FIG. 7 is a circuit diagram illustrating an example of a wireless power transmission system in which capacitors are connected in parallel to a wireless power transmission apparatus and a wireless power reception apparatus.

FIG. 7 illustrates an equivalent circuit of a wireless power transmission system in which capacitors are connected in parallel to a wireless power transmission apparatus and a wireless power reception apparatus.

Referring to FIG. 7, a capacitor $C_{f0}$ is connected in parallel to the power supply unit 220 of FIG. 2, a capacitor $C_{f1}$ is connected in parallel to the power converter 330 of FIG. 3 of a first target, for example, a first wireless power reception apparatus, and a capacitor $C_{f2}$ is connected in parallel to the power converter 330 of a second target, for example, a second power reception apparatus.

Impedances $Z'_1$, $Z'_2$, $Z'_0$, and $Z_{IN}$ viewed from each end of FIG. 7 may be re-expressed, as given by Equation 7.

$$Z'_1 = R_1 + \frac{\omega^2 M_1^2}{R_{f1} + \frac{j\omega L_{f1}}{1 + j\omega C_{f1} Z_{L1}}} \quad \text{[Equation 7]}$$

$$Z'_2 = R_2 + \frac{\omega^2 M_2^2}{R_{f2} + \frac{j\omega L_{f2}}{1 + j\omega C_{f2} Z_{L2}}}$$

$$Z'_0 = R_0 + \frac{\omega^2 M_{01}^2}{Z'_1} + \frac{\omega^2 M_{02}^2}{Z'_2}$$

$$Re[Z_{IN}] = \frac{L_{f0}}{C_{f0}\left(R_{f0} + \frac{\omega^2 M_0^2}{Z'_0}\right)}$$

$$Z'_0 = R_0 + \frac{\omega^2 M_{01}^2}{Z'_1} + \frac{\omega^2 M_{02}^2}{Z'_2} + \ldots + \frac{\omega^2 M_{0n}^2}{Z'_n}$$

In a case in which a single target resonator is provided, when a load impedance increases, a result of an increase in $Z_{L1} \rightarrow$ an increase in $Z'_1 \rightarrow$ a decrease in $Z'_0 \rightarrow$ a decrease in $Z_{IN}$ may be inferred.

TABLE 2

| | Single target resonator, Increase in load impedance | Increase in number of target resonators | Multiple target resonators, Increase in load impedance of $n^{th}$ target resonator |
|---|---|---|---|
| $1^{st}$ capacitor: Parallel, $2^{nd}$ capacitor: Parallel | Decrease in $Z_{IN}$ | Decrease in $Z_{IN}$ | Increase in $Z_{IN}$ Increase in power distribution rate of $n^{th}$ target resonator |
| $1^{st}$ capacitor: Series, $2^{nd}$ capacitor: Series | Decrease in $Z_{IN}$ | Increase in $Z_{IN}$ | Decrease in $Z_{IN}$ Decrease in power distribution rate of $n^{th}$ target resonator |
| $1^{st}$ capacitor: Series, $2^{nd}$ capacitor: Parallel | Increase in $Z_{IN}$ | Increase in $Z_{IN}$ | Increase in $Z_{IN}$ Increase in power distribution rate of $n^{th}$ target resonator |
| $1^{st}$ capacitor: Parallel, $2^{nd}$ capacitor: Series | Increase in $Z_{IN}$ | Decrease in $Z_{IN}$ | Decrease in $Z_{IN}$ Decrease in power distribution rate of $n^{th}$ target resonator |

When a number of target resonators increases, a result of an increase in $Z'_0 \rightarrow$ an increase in $Z_{IN}$ may be inferred.

In a case in which multiple target resonators are provided, when a load impedance $Z_{Ln}$ of an $n^{th}$ target resonator increases, $Z'_n$ may increase. Thus, a value of a term including $Z'_n$ may be relatively less than a value of a term excluding $Z'_n$ in an equation of $Z'_0$. Accordingly, an amount of power to be transferred to the $n^{th}$ target resonator, rather than other target resonators, may decrease. It may be also inferred that $Z_{IN}$ may decrease as $Z'_0$ decreases. The results shown in Table 1 provided with reference to FIG. 4 may be inferred based on an impedance at each end in the equivalent circuit described above.

The following equation is an equation for calculating a voltage to be applied to a load and an input impedance, in a case of a capacitor $C_{f0}$ being connected in series or parallel when a single source resonator and N target resonators are provided.

Basic Equation $$\begin{bmatrix} V_s \\ 0 \\ 0 \\ V_{L1} \\ 0 \\ V_{L2} \\ \vdots \end{bmatrix} = \begin{bmatrix} Z_{f0} & j\omega M_0 & 0 & 0 & 0 & 0 & \\ j\omega M_0 & Z_0 & j\omega M_{01} & 0 & j\omega M_{02} & 0 & \\ 0 & j\omega M_{01} & Z_1 & j\omega M_1 & 0 & 0 & \cdots \\ 0 & 0 & j\omega M_1 & Z_{f1} & 0 & 0 & \\ 0 & j\omega M_{02} & 0 & 0 & Z_2 & j\omega M_2 & \\ 0 & 0 & 0 & 0 & j\omega M_2 & Z_{f2} & \\ & & & \vdots & & & \ddots \end{bmatrix}, \begin{bmatrix} I_{f0} \\ I_0 \\ I_1 \\ I_{f1} \\ I_2 \\ I_{f1} \\ \vdots \end{bmatrix}$$

where $$\begin{cases} Z_{fn} = R_{nf} + j\omega L_{fn} \\ Z_n = R_n + j\omega L_n + 1/j\omega C_n \end{cases}$$

Input/Load Impedance:

Series: $Z_{IN} = Z_{f0} + \dfrac{1}{j\omega C_{f0}}\left(Z_{IN} = \dfrac{V_s}{I_s}\right)$ Parallel: $Z_{IN} = Z_{f0} \left\| \dfrac{1}{j\omega C_{f0}} \left(Z_{IN} = \dfrac{V_s}{I_s}\right) \right.$ Load Voltage:

Series: $V_{Ln} = -I_{fn}\left(Z_{Ln} + \dfrac{1}{j\omega C_{fn}}\right)$

Parallel: $V_{Ln} = -I_{fn}\left(Z_{Ln} \left\| \dfrac{1}{j\omega C_{fn}} \right.\right)$ A compatibility of power transmission through a mutual resonant between a source resonator and a target resonator in a case in which the power supply unit 220 of FIG. 2 and the power converter 300 of FIG. 3 are provided, and in a case in which the power supply unit 220 of FIGS. 5B and 6B is absent, may be determined based on a value of U to be calculated using Equation 8.

The value of U denotes a performance index of a power link between the source resonator and the target resonator, and may indicate a form of wireless power transmission efficiency.

$$U = \kappa\sqrt{Q_1 Q_2} \quad \text{[Equation 8]}$$
$$= \dfrac{\omega\kappa\sqrt{L_1 L_2}}{\sqrt{R_1 R_2}}$$
$$= \dfrac{\sqrt{Z_{12} Z_{21}}}{\sqrt{Z_{11} Z_{22}}}$$
$$= \sqrt{\dfrac{AD - BC}{AD}}$$

In Equation 8, $Q_1$ denotes a quality factor of the source resonator, $Q_2$ denotes a quality factor of the target resonator, $\kappa$ denotes a coefficient determined based on a distance between the source resonator and the target resonator, and $\omega$ denotes respective frequencies when the source resonator and the target resonator resonate. $L_1$ denotes an inductance of the source resonator, $L_2$ denotes an inductance of the target resonator, $R_1$ denote a resistance of the source resonator, and $R_2$ denotes a resistance of the target resonator.

Irrespective of types of the resonators, when a difference between values of U calculated using Equation 8 is within a range of 30%, it may be determined that a compatibility between the source resonator and the target resonator is maintained. For example, a percentage of the difference between the values of U may be calculated by (Difference between values of U/Greater value of two values of U)×100%. While 30% is used as an example, a predetermined range that differs from 30% may be used in other examples to determine the compatibility.

For example, when a value of $U_1$ between a source resonator and a first target resonator corresponds to "10", and a value of $U_2$ between the source resonator and a second target resonator corresponds to "15", a difference between the value of $U_1$ and the value of $U_2$ may correspond to "5" and the value of $U_2$ is the greater value of the two values. Accordingly, 5/15×100%=33.3% may be obtained. In this instance, when a product is produced so that a compatibility between the source resonator and the first target resonator may be maintained, it may be determined that a compatibility between the source resonator and the second target resonator is not maintained since the difference between the values of U is out of the range of 30%. Conversely, when a product is produced so that a compatibility between the source resonator and the second target resonator may be maintained, it may be determined that a compatibility between the source resonator and the first target resonator is not maintained.

In addition, although the resonators have different quality factors and different values of K, a compatibility of the resonators may be maintained when the values of U are compatible.

The value of U may be calculated based on Z parameters, and ABCD parameters. Parameters of Equation 8 may be obtained using various radio frequency (RF) measurement apparatuses, for example, an impedance analyzer, a network analyzer, and the like. For example, the Z parameters and the ABCD parameters may be readily calculated using results of measuring S parameters of the network analyzer.

Figure 8:
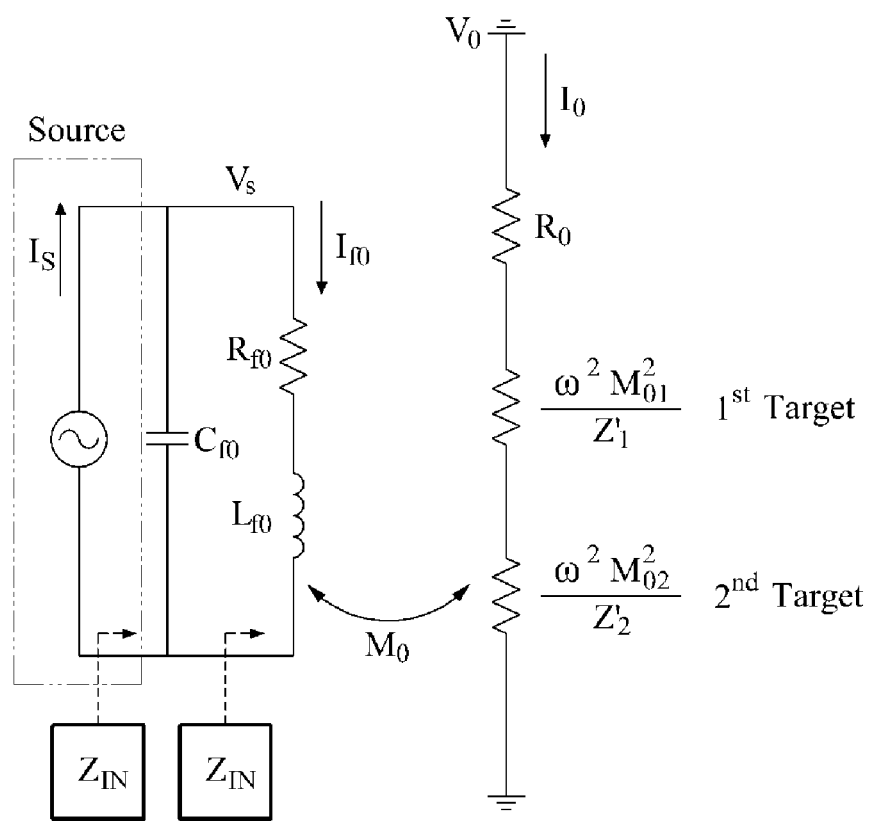
FIG. 8 is a circuit diagram illustrating an example of the wireless power transmission system of FIG. 7.

FIG. 8 illustrates a simplified example of the equivalent circuit of the wireless power transmission system of FIG. 7.

The equivalent circuit of FIG. 7 may be simply presented as shown in FIG. 8, through circuit calculation. FIG. 8 illustrates an equivalent circuit that is to be used for calculating an input impedance in a case in which two wireless power reception apparatuses and a single wireless power transmission apparatus are provided.

Figure 9:
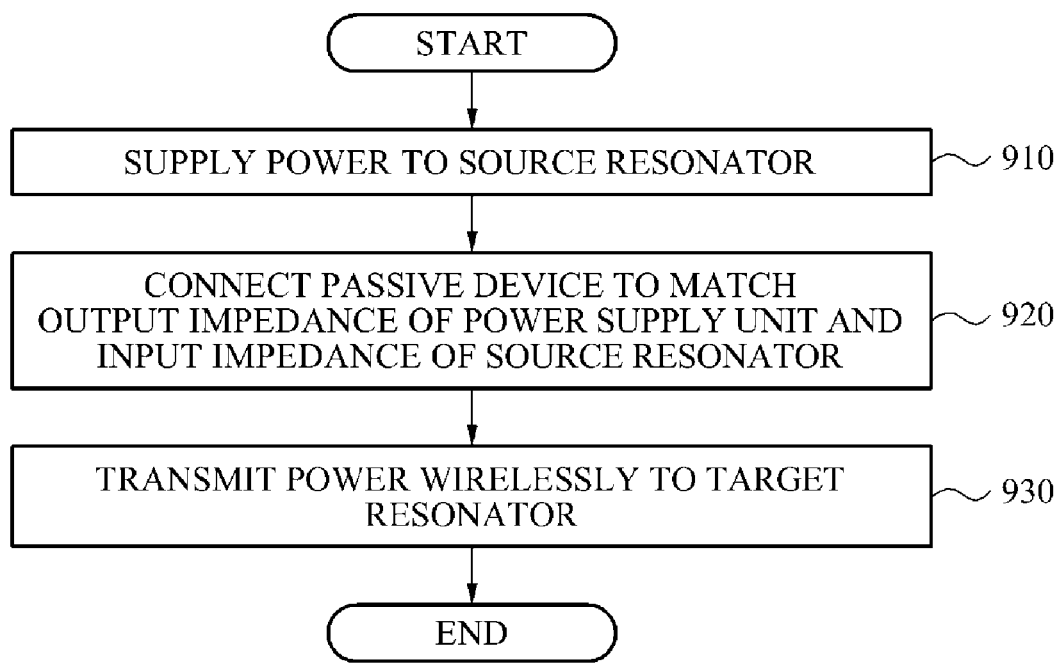
FIG. 9 is a flowchart illustrating an example of a method for wireless power transmission.

FIG. 9 illustrates an example of a wireless power transmission method.

Referring to FIG. 9, in 910, a power supply unit of a wireless power transmission apparatus supplies power to a source resonator.

In 920, the wireless power transmission apparatus connects, based on a characteristic of the power supply unit, a passive device to the power supply unit in series or in parallel to match an output impedance of the power supply unit and an input impedance of the source resonator to each other.

In 930, the wireless power transmission apparatus transmits power wirelessly to a target resonator, through a mutual resonance between the source resonator and the target resonator.

The wireless power transmission apparatus may determine a compatibility between the source resonator and another target resonator, based on a difference between a first power link performance index between the source resonator and the target resonator and a second power link performance index between the source resonator and the other target resonator. A power link performance index may be expressed by a value of U, and may be calculated using Equation 8. In a way, the power link performance index may indicate a form of wireless power transmission efficiency.

The wireless power transmission apparatus may determine that the compatibility between the source resonator and the other target resonator is maintained, when the difference between the first power link performance index and the second power link performance index is within a predetermined range, for example, a range of 30%.

Figure 10:
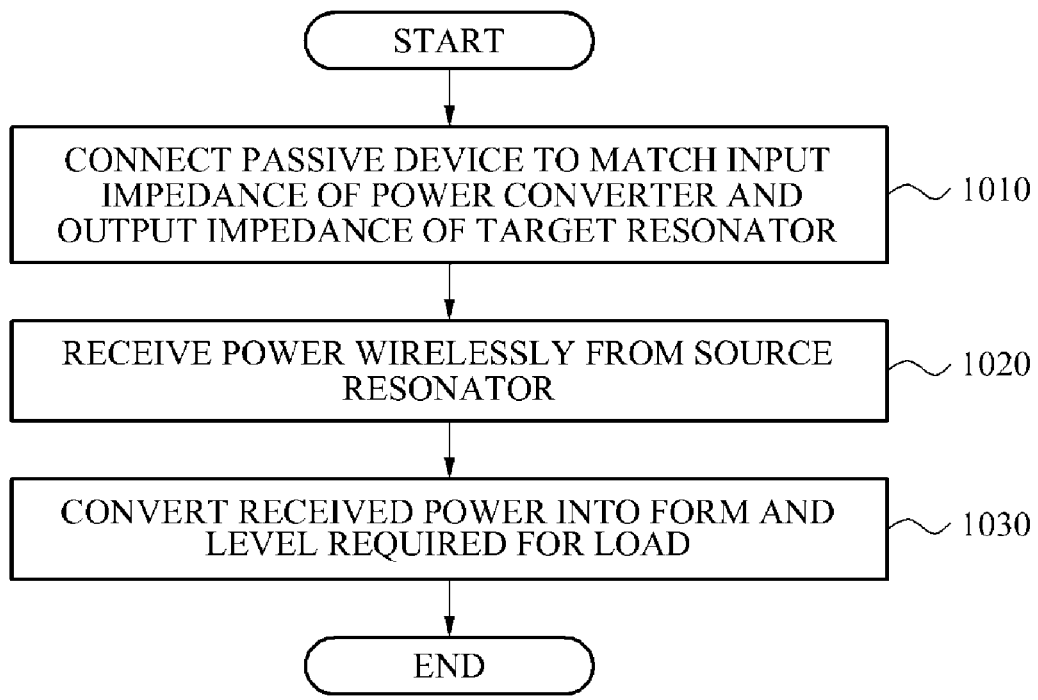
FIG. 10 is a flowchart illustrating an example of a method for wireless power reception.

FIG. 10 illustrates an example of a wireless power reception method.

Referring to FIG. 10, in 1010, a wireless power reception apparatus connects a passive device to a power converter in parallel or series to match an input impedance of the power converter and an output impedance of the target resonator.

In 1020, the wireless power reception apparatus receives power wirelessly from a source resonator, through a mutual resonance between a target resonator and the source resonator.

In 1030, the wireless power reception apparatus converts the power received by the target resonator into a form and a level required for a load.

FIGS. 11A through 12B illustrate examples of applications in which a wireless power reception apparatus is mounted on a wireless power transmission apparatus.

Figure 11A:
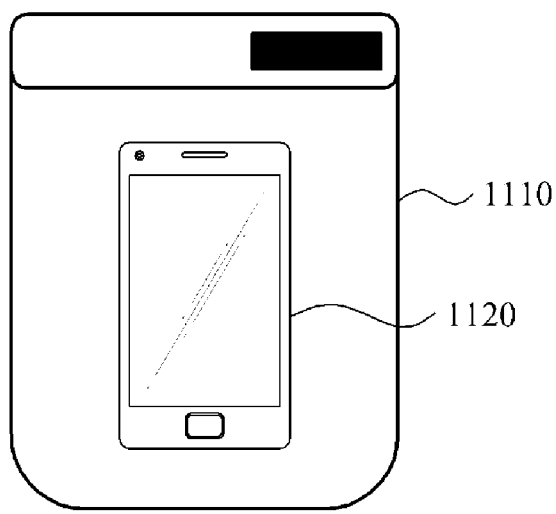
FIGS. 11A through 11B are diagrams illustrating examples of a wireless power reception apparatus and a wireless power transmission apparatus on which the wireless power reception apparatus is mounted.
Figure 11B:
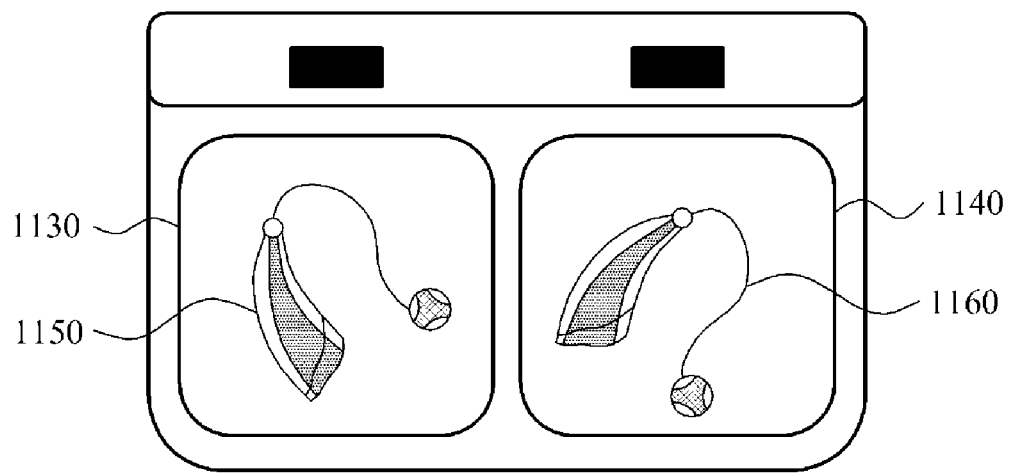

FIG. 11A illustrates an example of wireless power charging between a pad 1110 and a mobile terminal 1120, and FIG. 11B illustrates an example of wireless power charging between pads 1130 and 1140 and hearing aids 1150 and 1160, respectively.

Referring to FIG. 11A, a wireless power transmission apparatus may be mounted in the pad 1110, and a wireless power reception apparatus may be mounted in the mobile terminal 1120. The pad 1110 may charge a single mobile terminal, namely, the mobile terminal 1120. In another example, more than one mobile terminal or devices may be charged by the pad 1110.

Referring to FIG. 11B, two wireless power transmission apparatuses may be respectively mounted in the pads 1130 and 1140. The hearing aids 1150 and 1160 may be used for a left ear and a right ear, respectively. Two wireless power reception apparatuses may be respectively mounted in the hearing aids 1150 and 1160. The pads 1130 and 1140 may simultaneously charge both hearing aids 1150 and 1160. The pads 1130 and 1140 may be a part of one wireless power transmission apparatus.

Figure 12A:
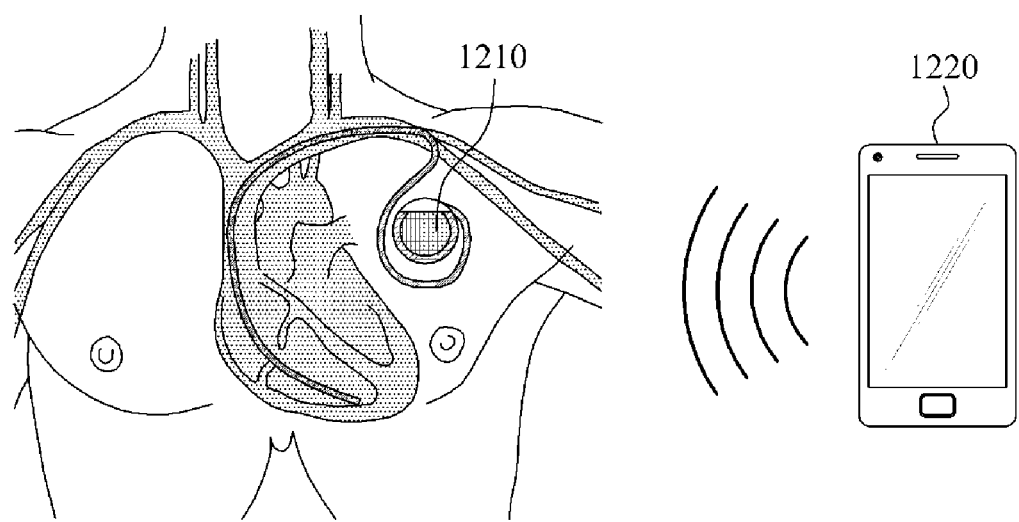
FIGS. 12A through 12B are diagrams illustrating examples of a wireless power reception apparatus and a wireless power transmission apparatus that is charging the wireless power reception apparatus.
Figure 12B:
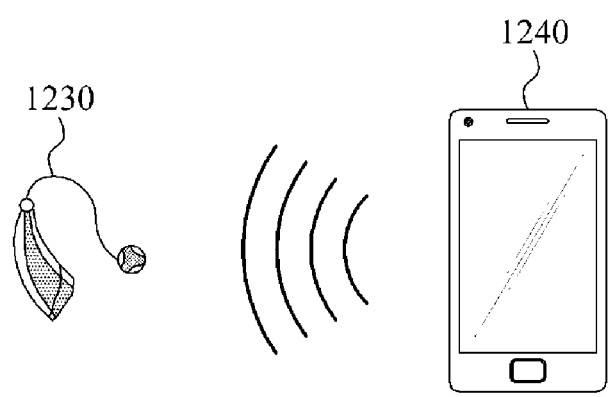

FIG. 12A illustrates an example of wireless power charging between an electronic device 1210 inserted into a human body, and a mobile terminal 1220. FIG. 12B illustrates an example of wireless power charging between a hearing aid 1230 and a mobile terminal 1240.

Referring to FIG. 12A, a wireless power transmission apparatus and a wireless power reception apparatus may be mounted in the mobile terminal 1220. Another wireless power reception apparatus may be mounted in the electronic device 1210. The electronic device 1210 may be charged by receiving power from the mobile terminal 1220. The 1210 may be a medical device or an apparatus implanted into the human body, such as a pacemaker or an artificial organ.

Referring to FIG. 12B, a wireless power transmission apparatus and a wireless power reception apparatus may be mounted in the mobile terminal 1240. Another wireless power reception apparatus may be mounted in the hearing aid 1230. The hearing aid 1230 may be charged by receiving power from the mobile terminal 1240. Low-power electronic devices, for example, Bluetooth earphones, may also be charged by receiving power from the mobile terminal 1240.

Figure 13:
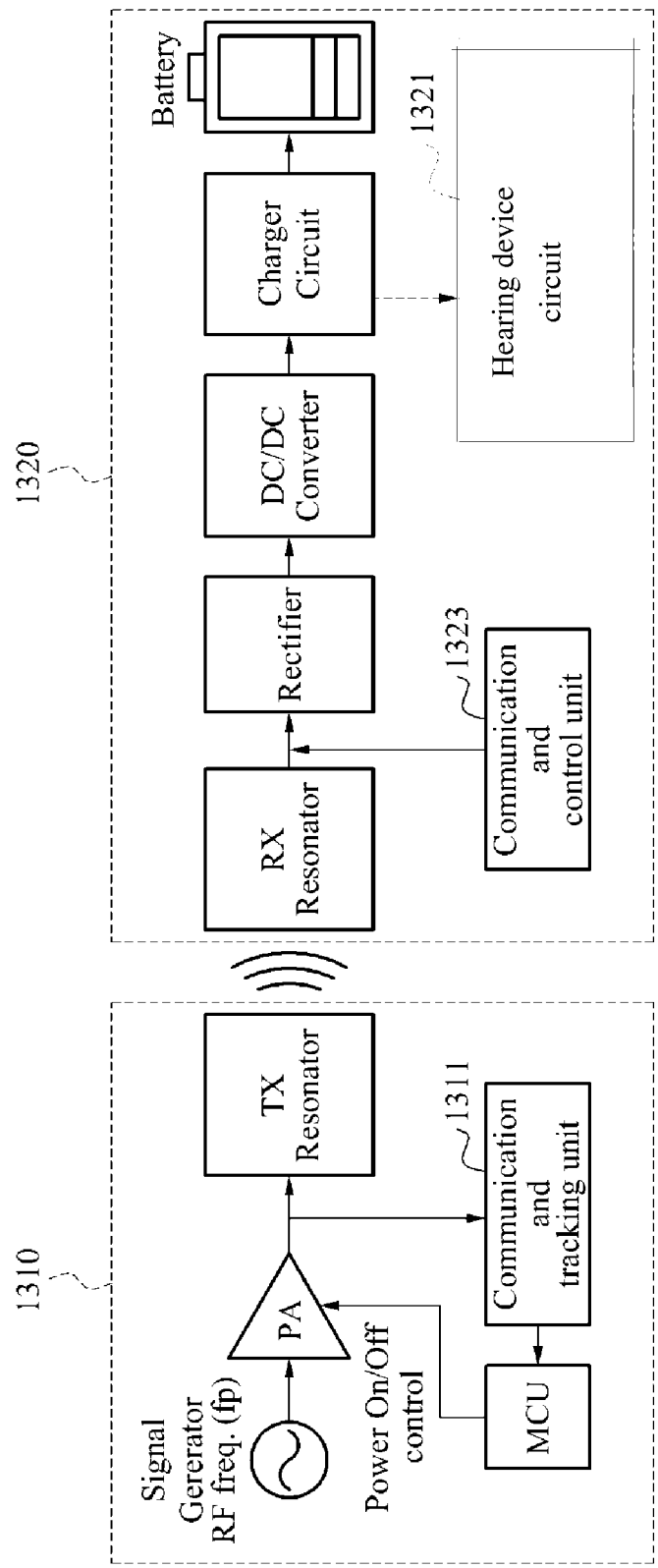
FIG. 13 is a diagram illustrating an example of a wireless power transmission apparatus and a wireless power reception apparatus.

FIG. 13 illustrates an example of a wireless power transmission apparatus and a wireless power reception apparatus.

A wireless power transmission apparatus 1310 may be mounted in each of the pad 1130, hereinafter the first pad, and the pad 1140, hereinafter the second pad, of FIG. 11B. Additionally, the wireless power transmission apparatus 1310 may be mounted in the mobile terminal 1240 of FIG. 12B.

A wireless power reception apparatus 1320 may be mounted in each of the hearing aids 1150 and 1160 of FIG. 11B.

The wireless power transmission apparatus 1310 may be configured similarly to the source 110 of FIG. 1. For example, the wireless power transmission apparatus 1310 may include a unit configured to transmit power using magnetic coupling.

In FIG. 13, a communication and tracking unit 1311 may communicate with the wireless power reception apparatus 1320, and may control an impedance and a resonant frequency to maintain a wireless power transmission efficiency. For example, the communication and tracking unit 1311 may be similar in function to the communication unit 115 of FIG. 1.

The wireless power reception apparatus 1320 may be configured similarly to the target 120 of FIG. 1. For example, the wireless power reception apparatus 1320 may include a unit configured receive power wirelessly and to charge a battery. As illustrated in FIG. 13, the wireless power reception apparatus 1320 includes a target resonator, for example, an Rx resonator, a rectifier, a DC/DC converter, and a charger circuit. Additionally, the wireless power reception apparatus 1320 further includes a communication and control unit 1323.

The communication and control unit 1323 may communicate with the wireless power transmission apparatus 1310, and may perform an operation to protect overvoltage and overcurrent.

Further, the wireless power reception apparatus 1320 may include other electronic components that consume power. For example, the wireless power reception apparatus 1320 may include a hearing device circuit 1321. The hearing device circuit 1321 may be charged by the battery. The hearing device circuit 1321 may include a microphone, an ADC, a processor, a digital-to-analog (D/A) converter, and a receiver. For example, the hearing device circuit 1321 may have the same configuration as a hearing aid.

Hereinafter, the term "resonator" in FIGS. 14A through 14B may include, for example, a source resonator, and a target resonator. The resonators of FIGS. 14A through 14B may be applied to the resonators of FIGS. 1 through 13.

Figure 14A:
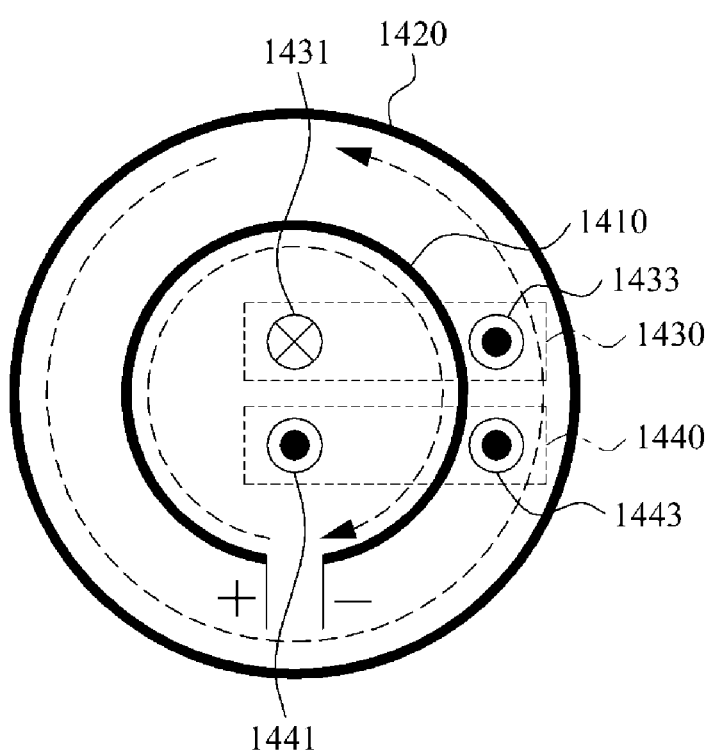
FIG. 14A is a diagram of an example of a wireless power transmission apparatus illustrating a distribution of a magnetic field in a feeder and a resonator.
Figure 14B:
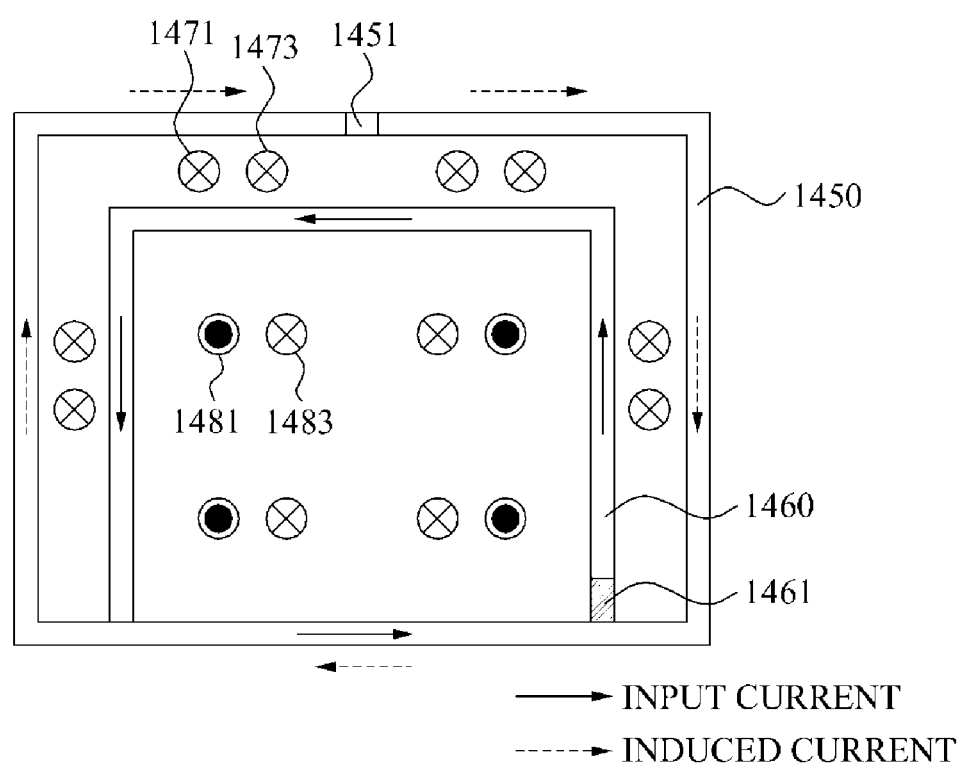
FIG. 14B is a diagram of another example of a wireless power transmission apparatus illustrating a distribution of a magnetic field in a feeder and a resonator.

FIGS. 14A and 14B illustrate examples of a distribution of a magnetic field in a feeder and a resonator.

When a resonator receives power supplied through a separate feeder, magnetic fields may form in both the feeder and the resonator.

Referring to FIG. 14A, a magnetic field 1430 may form as input current flows into a feeder 1410. A direction 1431 of the magnetic field 1430 within the feeder 1410 may have a phase opposite to a phase of a direction 1433 of the magnetic field 1430 outside the feeder 1410. The magnetic field 1430 formed by the feeder 1410 may induce a current to form inside a resonator 1420. The direction of the induced current may be opposite to a direction of the input current.

Due to the induced current, a magnetic field 1440 may form in the resonator 1420. Directions of a magnetic field formed due to induced current in all positions of the resonator 1420 may be the same. Accordingly, a direction 1441 of the magnetic field 1440 formed by the resonator 1420 may have a phase identical to a phase of a direction 1443 of the magnetic field 1440 formed by the resonator 1420.

Thus, when the magnetic field 1430 formed by the feeder 1410 and the magnetic field 1440 formed by the resonator 1420 are combined, strength of the total magnetic field may decrease within the feeder 1410; however, the strength may increase outside the feeder 1410. In an example in which power is supplied to the resonator 1420 through the feeder 1410 configured as illustrated in FIG. 14A, the strength of the total magnetic field may decrease in the center of the resonator 1420, but may increase outside the resonator 1420. In another example in which a magnetic field is randomly distributed in the resonator 1420, it may be difficult to perform impedance matching because an input impedance may frequently vary. Additionally, when the strength of the total magnetic field increases, an efficiency of wireless power transmission may increase. Conversely, when the strength of the total magnetic field decreases, the efficiency for wireless power transmission may be reduced. Accordingly, the power transmission efficiency may be reduced on average.

FIG. 14B illustrates an example of a structure of a wireless power transmission apparatus in which a resonator 1450 and a feeder 1460 have a common ground. The resonator 1450 includes a capacitor 1451. The feeder 1460 may receive an input of an RF signal via a port 1461. For example, when the RF signal is input to the feeder 1460, input current may be generated in the feeder 1460. The input current flowing in the feeder 1460 may cause a magnetic field to form, and the magnetic field may induce a current to form inside the resonator 1450. Additionally, another magnetic field may form due to the induced current flowing in the resonator 1450. In this example, a direction of the input current flowing in the feeder 1460 may have a phase opposite to a phase of a direction of the induced current flowing in the resonator 1450. Accordingly, in a region between the resonator 1450 and the feeder 1460, a direction 1471 of the magnetic field formed due to the input current may have the same phase as a direction 1473 of the magnetic field formed due to the induced current; thus, the strength of the total magnetic field may increase. Conversely, within the feeder 1460, a direction 1481 of the magnetic field formed due to the input current may have a phase opposite to a phase of a direction 1483 of the magnetic field formed due to the induced current; thus, the strength of the total magnetic field may decrease. Therefore, the strength of the total magnetic field may decrease in the center of the resonator 1450, but may increase outside the resonator 1450.

The feeder 1460 may determine an input impedance by adjusting an internal area of the feeder 1460. The input impedance refers to an impedance viewed in a direction from the feeder 1460 to the resonator 1450. When the internal area of the feeder 1460 increases, the input impedance may increase. Conversely, when the internal area of the feeder 1460 is reduced, the input impedance may be reduced. Because the magnetic field is randomly distributed in the resonator 1450 despite a reduction in the input impedance, a value of the input impedance may vary based on a location of a target device. Accordingly, a separate matching network may be required to match the input impedance to an output impedance of a power amplifier. For example, when the input impedance increases, a separate matching network may be used to match the increased input impedance to a relatively low output impedance.

Figure 15A:
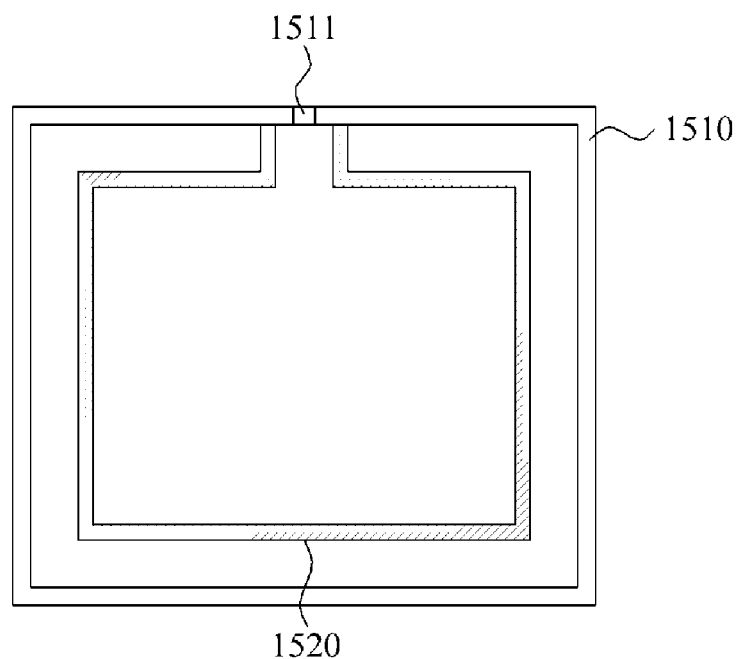
FIGS. 15A and 15B are diagrams illustrating an example of a wireless power transmission apparatus.

FIG. 15A illustrates an example of a wireless power transmission apparatus.

Referring to FIG. 15A, the wireless power transmission apparatus includes a resonator 1510, and a feeding unit 1520. The resonator 1510 may further include a capacitor 1511. The feeding unit 1520 may be electrically connected to both ends of the capacitor 1511.

Figure 15B:
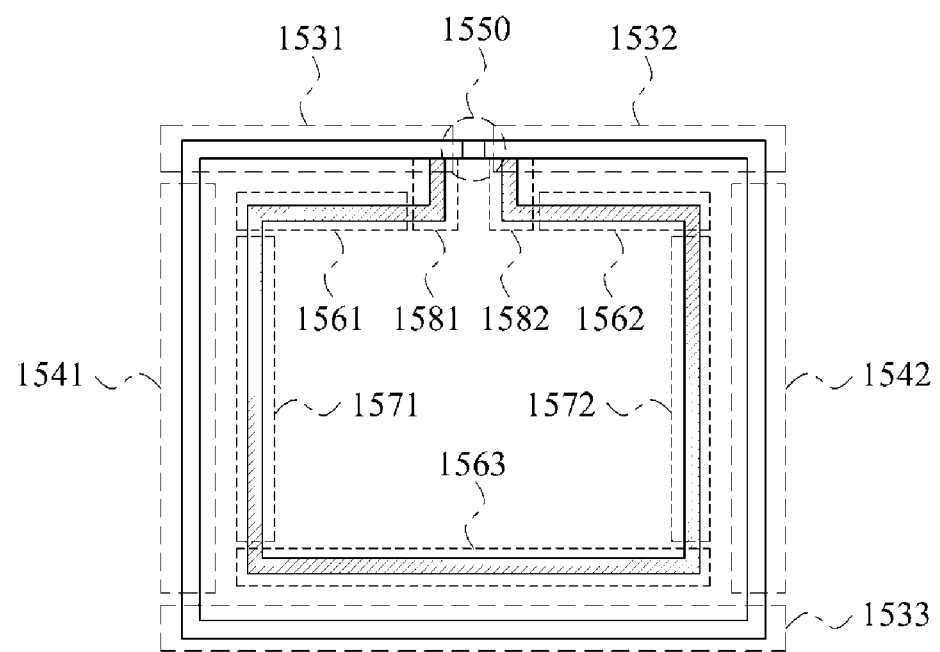

FIG. 15B illustrates structures of the wireless power transmission apparatus of FIG. 15A in detail. The resonator 1510 may include a first transmission line, a first conductor 1541, a second conductor 1542, and at least one first capacitor 1550.

The first capacitor 1550 may be inserted in series between a first signal conducting portion 1531 and a second signal conducting portion 1532 in the first transmission line, and an electric field may be confined within the first capacitor 1550. For example, the first transmission line may include at least one conductor in an upper portion of the first transmission line, and may also include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 1531 and the second signal conducting portion 1532. A conductor disposed in a lower portion of the first transmission line may be referred to as a first ground conducting portion 1533.

Referring to FIG. 15B, the resonator 1510 may have a substantially two-dimensional (2D) structure. The first transmission line may include the first signal conducting portion 1531 and the second signal conducting portion 1532 in the upper portion of the first transmission line. In addition, the first transmission line may include the first ground conducting portion 1533 in the lower portion of the first transmission line. The first signal conducting portion 1531 and the second signal conducting portion 1532 may face the first ground conducting portion 1533. Current may flow through the first signal conducting portion 1531 and the second signal conducting portion 1532.

Additionally, one end of the first signal conducting portion 1531 may be electrically connected (i.e., shorted) to the first conductor 1541, and another end of the first signal conducting portion 1531 may be connected to the first capacitor 1550. One end of the second signal conducting portion 1532 may be shorted to the second conductor 1542, and another end of the second signal conducting portion 1532 may be connected to the first capacitor 1550. Accordingly, the first signal conducting portion 1531, the second signal conducting portion 1532, the first ground conducting portion 1533, and the conductors 1541 and 1542 may be connected to each other, so that the resonator 1510 may have an electrically closed-loop structure. The term "loop structure" may include, for example, a polygonal structure such as a rectangular structure, octagonal structure and the like, and partially or entirely round structure, such as a circular structure, an elliptical structure and the like. "Having a loop structure" may indicate that the circuit is electrically closed.

The first capacitor 1550 may be inserted into an intermediate portion of the first transmission line. For example, the first capacitor 1550 may be inserted into a space between the first signal conducting portion 1531 and the second signal conducting portion 1532. The first capacitor 1550 may be configured as a lumped element, a distributed element, and the like. For example, a capacitor configured as a distributed element may include zigzagged conductor lines and a dielectric material that has a high permittivity positioned between the zigzagged conductor lines.

When the first capacitor 1550 is inserted into the first transmission line, the resonator 1510 may have a characteristic of a metamaterial. A metamaterial refers to a material having a predetermined electrical property that is not discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials found in nature, a right hand rule may be applied to an electric field, a magnetic field, and a pointing vector; thus, the corresponding materials are referred to as right handed materials (RHMs). However, a metamaterial has a magnetic permeability or a permittivity absent in nature, and may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the first capacitor 1550 inserted as the lumped element is appropriately set, the resonator 1510 may have the characteristic of the metamaterial. Because the resonator 1510 may have a negative magnetic permeability by appropriately adjusting the capacitance of the first capacitor 1550, the resonator 1510 may also be referred to as an MNG resonator. Various criteria may be applied to determine the appropriate amount of capacitance of the first capacitor 1550. For example, the various criteria may include a criterion for enabling the resonator 1510 to have the characteristic of the metamaterial, a criterion for enabling the resonator 1510 to have a negative magnetic permeability in a target frequency, a criterion for enabling the resonator 1510 to have a zeroth order resonance characteristic in the target frequency, and the like. Based on at least one criterion among the aforementioned criteria, the capacitance of the first capacitor 1550 to be used may be determined.

The resonator 1510, also referred to as the MNG resonator 1510, may have a zeroth order resonance characteristic of having, as a resonance frequency, a frequency when a propagation constant is "0". Because the resonator 1510 may have a zeroth order resonance characteristic, the resonance frequency may be independent with respect to a physical size of the MNG resonator 1510. By appropriately designing or determining the configuration of the first capacitor 1550, the MNG resonator 1510 may sufficiently change the resonance frequency without changing the physical size of the MNG resonator 1510.

In a near field, for instance, the electric field may be concentrated on the first capacitor 1550 inserted into the first transmission line. Accordingly, due to the first capacitor 1550, the magnetic field may become dominant in the near field. The MNG resonator 1510 may have a relatively high Q-argument using the first capacitor 1550 of the lumped element; thus, it may be possible to enhance an efficiency of power transmission. For example, the Q-argument may indicate a level of an ohmic loss or a ratio of a reactance with respect to a resistance in the wireless power transmission. The efficiency of the wireless power transmission may increase according to an increase in the Q-argument.

Although not illustrated in FIG. 15B, a magnetic core may be further provided to pass through the MNG resonator 1510. The magnetic core may perform a function of increasing a power transmission distance.

Referring to FIG. 15B, the feeding unit 1520 may include a second transmission line, a third conductor 1571, a fourth conductor 1572, a fifth conductor 1581, and a sixth conductor 1582.

The second transmission line may include a third signal conducting portion 1561 and a fourth signal conducting portion 1562 in an upper portion of the second transmission line. In addition, the second transmission line may include a second ground conducting portion 1563 in a lower portion of the second transmission line. The third signal conducting portion 1561 and the fourth signal conducting portion 1562 may face the second ground conducting portion 1563. Current may flow through the third signal conducting portion 1561 and the fourth signal conducting portion 1562.

Additionally, one end of the third signal conducting portion 1561 may be shorted to the third conductor 1571, and another end of the third signal conducting portion 1561 may be connected to the fifth conductor 1581. One end of the fourth signal conducting portion 1562 may be shorted to the fourth conductor 1572, and another end of the fourth signal conducting portion 1562 may be connected to the sixth conductor 1582. The fifth conductor 1581 may be connected to the first signal conducting portion 1531, and the sixth conductor 1582 may be connected to the second signal conducting portion 1532. The fifth conductor 1581 and the sixth conductor 1582 may be connected in parallel to both ends of the first capacitor 1550. In this example, the fifth conductor 1581 and the sixth conductor 1582 may be used as input ports to receive an RF signal as an input.

Accordingly, the third signal conducting portion 1561, the fourth signal conducting portion 1562, the second ground conducting portion 1563, the third conductor 1571, the fourth conductor 1572, the fifth conductor 1581, the sixth conductor 1582, and the resonator 1510 may be connected to each other, so that the resonator 1510 and the feeding unit 1520 may have an electrically closed-loop structure. The term "loop structure" may include, for example, a polygonal structure such as a rectangular structure, an octagonal structure, and the like, or a partially or entirely round structure, such as a circular structure, an elliptical structure and the like. When an RF signal is received via the fifth conductor 1581 or the sixth conductor 1582, input current may flow in the feeding unit 1520 and the resonator 1510, a magnetic field may form due to the input current. The magnetic field may induce a current in the resonator 1510. A direction of the input current flowing in the feeding unit 1520 may be the same as a direction of the induced current flowing in the resonator 1510. Thus, strength of the total magnetic field may increase in the center of the resonator 1510, but may decrease outside the resonator 1510.

An input impedance may be determined based on an area of a region between the resonator 1510 and the feeding unit 1520; accordingly, a separate matching network used to match the input impedance to an output impedance of a power amplifier may not be required. For example, even when the matching network is used, the input impedance may be determined by adjusting a size of the feeding unit 1520; thus, a structure of the matching network may be portable. The portable structure of the matching network may minimize a matching loss of the matching network.

The second transmission line, the third conductor 1571, the fourth conductor 1572, the fifth conductor 1581, and the sixth conductor 1582 may form the same structure as the resonator 1510. In an example in which the resonator 1510 has a loop structure, the feeding unit 1520 may also have a loop structure. In another example in which the resonator 1510 has a circular structure, the feeding unit 1520 may also have a circular structure.

FIG. 16A illustrates an example of a distribution of a magnetic field within a resonator based on feeding of a feeding unit.

Figure 16B:
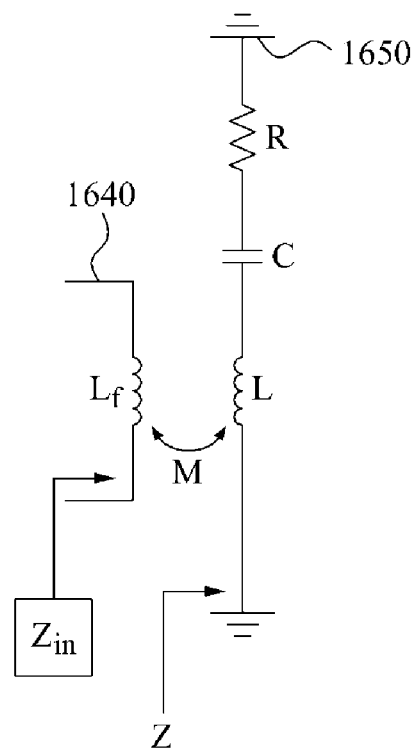
FIG. 16B is a diagram illustrating examples of equivalent circuits of a feeder and a resonator.

A feeding operation may refer to supplying power to a source resonator in wireless power transmission, or refer to supplying AC power to a rectification unit in wireless power transmission. FIG. 16A illustrates a direction of input current flowing in the feeding unit, and a direction of induced current induced in the source resonator. Additionally, FIG. 16A illustrates a direction of a magnetic field formed due to the input current of the feeding unit, and a direction of a magnetic field formed due to the induced current of the source resonator. In particular, FIG. 16A briefly illustrates the resonator 1510 and the feeding unit 1520 of FIG. 15A, and FIG. 16B illustrates examples of equivalent circuits of the feeding unit 1520 and the resonator 1510.

Referring to FIG. 16A, the fifth conductor 1581 or the sixth conductor 1582 of the feeding unit 1520 of FIG. 15A may be used as an input port 1610. The input port 1610 may receive an RF signal as an input. The RF signal may be output from a power amplifier. The power amplifier may increase or decrease an amplitude of the RF signal based on a demand by a target device. The RF signal received by the input port 1610 may be displayed in the form of input current flowing in the feeding unit 1520. The input current may flow in a clockwise direction in the feeding unit 1520, along a transmission line of the feeding unit 1520. The fifth conductor 1581 of the feeding unit 1520 may be electrically connected to the resonator 1510. For example, the fifth conductor 1581 may be connected to a first signal conducting portion 1531 of the resonator 1510. Accordingly, the input current may flow in the resonator 1510, as well as, in the feeding unit 1520. The input current may flow in a counterclockwise direction in the resonator 1510. The input current flowing in the resonator 1510 may cause a magnetic field to form. The magnetic field may generate current in the resonator 1510 by induction. The induced current may flow in a clockwise direction in the resonator 1510. For example, the induced current may transfer energy to the capacitor 1511 of the resonator 1510, and a magnetic field may form due to the induced current. In this example, the input current flowing in the feeding unit 1520 and the resonator 1510 of FIG. 15A is indicated by a solid line of FIG. 16A, and the induced current flowing in the resonator 1510 is indicated by a dotted line of FIG. 16A.

A direction of a magnetic field formed due to a current may be determined based on the right hand rule. Referring to FIG. 16A, within the feeding unit 1520, a direction 1621 of a magnetic field formed due to the input current flowing in the feeding unit 1520 may be identical to a direction 1623 of a magnetic field formed due to the induced current flowing in the resonator 1510. Accordingly, the strength of the total magnetic field may increase within the feeding unit 1520.

In a region between the feeding unit 1520 and the resonator 1510, a direction 1633 of a magnetic field formed due to the input current flowing in the feeding unit 1520 may have a phase opposite to a phase of a direction 1631 of a magnetic field formed due to the induced current flowing in the resonator 1510. Accordingly, the strength of the total magnetic field may decrease in the region between the feeding unit 1520 and the resonator 1510.

In general, a strength of a magnetic field decreases in the center of a resonator with the loop structure, and increases outside the resonator. However, referring to FIG. 16A, the feeding unit 1520 may be electrically connected to both ends of the capacitor 1511 of the resonator 1510, and accordingly the induced current of the resonator 1510 may flow in the same direction as the input current of the feeding unit 1520. Since the induced current of the resonator 1520 flows in the same direction as the input current of the feeding unit 1520, the strength of the total magnetic field may increase within the feeding unit 1520, and may decrease outside the feeding unit 1520. As a result, the strength of the total magnetic field may increase in the center of the resonator 1510 with the loop structure, and may decrease outside the resonator 1510, due to the feeding unit 1520. Thus, the strength of the total magnetic field may be equalized within the resonator 1510.

The power transmission efficiency for transferring a power from the source resonator to a target resonator may be in proportion to the strength of the total magnetic field formed in the source resonator. In other words, when the strength of the total magnetic field increases in the center of the resonator, the power transmission efficiency may also increase.

Referring to FIG. 16B, the feeding unit 1640 and the resonator 1650 may be expressed as equivalent circuits. An example of an input impedance $Z_{in}$ viewed in a direction from the feeding unit 1640 to the resonator 1650 may be computed, as given in Equation 9.

$$Z_{in} = \frac{(\omega M)^2}{Z}$$ [Equation 9]

In Equation 9, M denotes a mutual inductance between the feeding unit 1640 and the resonator 1650, ω denotes a resonance frequency between the feeding unit 1640 and the resonator 1650, and Z denotes an impedance viewed in a direction from the resonator 1650 to a target device. The input impedance $Z_{in}$ may be in proportion to the mutual inductance M. Thus, the input impedance $Z_{in}$ may be controlled by adjusting the mutual inductance M between the feeding unit 1640 and the resonator 1650. The mutual inductance M may be adjusted based on an area of a region between the feeding unit 1640 and the resonator 1650. The area of the region between the feeding unit 1640 and the resonator 1650 may be adjusted based on a size of the feeding unit 1640. Accordingly, the input impedance $Z_{in}$ may be determined based on the size of the feeding unit 1640, and a separate matching network may not be required to perform impedance matching with an output impedance of a power amplifier.

In the resonator 1650 and the feeding unit 1640 included in a wireless power reception apparatus, a magnetic field may be distributed as illustrated in FIG. 16A. The resonator 1650 may operate as a target resonator. For example, the target resonator may receive wireless power from a source resonator via magnetic coupling. Due to the received wireless power, induced current may be generated in the target resonator. A magnetic field formed due to the induced current in the target resonator may cause another induced current to be generated in the feeding unit 1640. In this example, when the resonator 1650 is connected to the feeding unit 1640 as illustrated in FIG. 16A, the induced current generated in the resonator 1650 may flow in the same direction as the induced current generated in the feeding unit 1640. Thus, the strength of the total magnetic field may increase within the feeding unit 1640, but may decrease in a region between the feeding unit 1640 and the resonator 1650.

Figure 17:
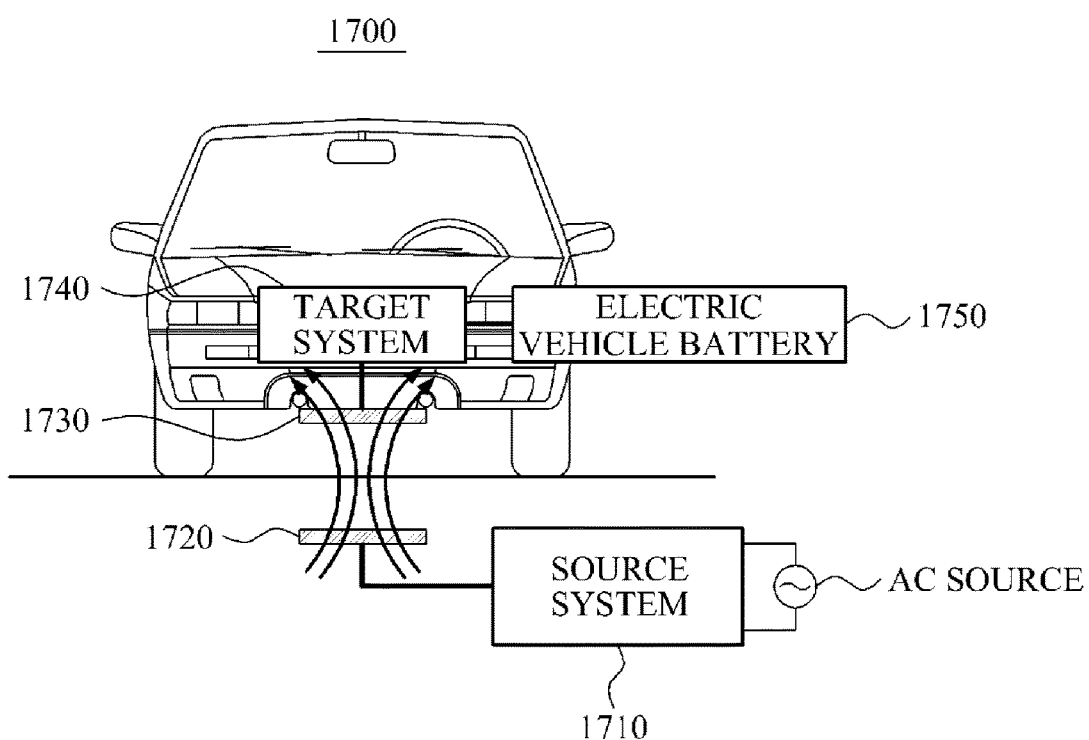
FIG. 17 is a diagram illustrating an example of an electric vehicle charging system.

FIG. 17 illustrates an example of an electric vehicle charging system.

Referring to FIG. 17, an electric vehicle charging system 1700 includes a source system 1710, a source resonator 1720, a target resonator 1730, a target system 1740, and an electric vehicle battery 1750.

The electric vehicle charging system 1700 may have a similar structure to the wireless power transmission system illustrated in FIG. 1. The source system 1710 and the source resonator 1720 in the electric vehicle charging system 1700 may function as a source. The target resonator 1730 and the target system 1740 in the electric vehicle charging system 1700 may function as a target.

The source system 1710 may include a variable SMPS, a power amplifier, a matching network, a controller, and a communication unit, similarly to the source 110 illustrated in FIG. 1. The target system 1740 may include a matching network, a rectification unit, a DC/DC converter, a communication unit, and a controller, similarly to the target 120 illustrated in FIG. 1.

The electric vehicle battery 1750 may be charged by the target system 1740.

The electric vehicle charging system 1700 may use a resonant frequency in a band of a few kilohertz (kHz) to tens of MHz to transmit power wirelessly.

The source system 1710 may generate power, based on a type of charging vehicle, a capacity of a battery, and a charging state of a battery, and may supply the generated power to the target system 1740.

The source system 1710 may control the source resonator 1720 and the target resonator 1730 to be aligned. For example, when the source resonator 1720 and the target resonator 1730 are not aligned, the controller of the source system 1710 may transmit a message to the target system 1740, and may control alignment between the source resonator 1720 and the target resonator 1730.

For example, when the target resonator 1730 is not located in a position enabling maximum magnetic resonance, the source resonator 1720 and the target resonator 1730 may not be aligned. When a vehicle does not stop accurately, the source system 1710 may induce a position of the vehicle to be adjusted, and may control the source resonator 1720 and the target resonator 1730 to be aligned.

In another example, the position of the source resonator 1720 may be adjusted to align the source resonator 1720 to the target resonator 1730 of the vehicle.

The source system 1710 and the target system 1740 may transmit or receive an ID of a vehicle, or may exchange various messages, through communication.

The descriptions of FIGS. 2 through 16B may apply to the electric vehicle charging system 1700. However, the electric vehicle charging system 1700 may use a resonant frequency in a band of a few kHz to tens of MHz, and may transmit power that is equal to or higher than tens of watts to charge the electric vehicle battery 1750.

FIGS. 18A through 18D illustrate examples of connection structures of passive devices to be used for the first matching unit 415 and the second matching unit 423 of FIG. 4.

Figure 18A:
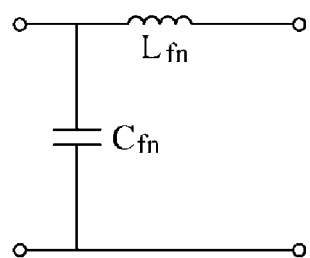
FIGS. 18A through 18D are diagrams illustrating examples of connection structures of passive devices to be used for the first matching unit 415 and the second matching unit 423 of FIG. 4.
Figure 18B:
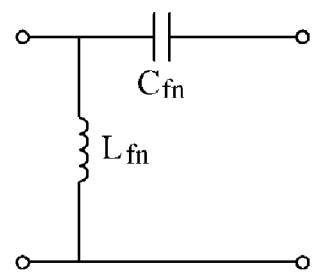
Figure 18C:
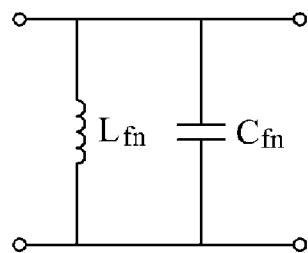
Figure 18D:
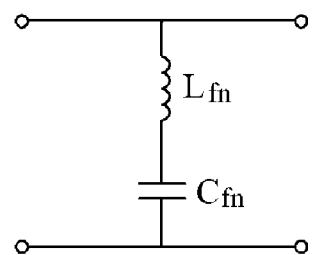

Referring to FIG. 18A, the first matching unit 415 and the second matching unit 423 may correspond to passive devices, and may include a capacitor $C_{fn}$ and an inductor $L_{fn}$. In the example illustrated in FIG. 18A, the capacitor $C_{fn}$ is connected in parallel and the inductor $L_{fn}$ is connected in series. Referring to FIG. 18B, contrary to the example illustrated in FIG. 18A, the capacitor $C_{fn}$ is connected in series and the inductor $L_{fn}$ is connected in parallel. Yet in another example, referring to FIG. 18C, both the capacitor $C_{fn}$ and the inductor $L_{fn}$ are connected in parallel. Referring to FIG. 18D, the capacitor $C_{fn}$ is connected in series to the inductor $L_{fn}$. The first matching unit 415 and the second matching unit 423 may be connected in one of the four connection structures.

In a wireless power transmission system described herein, impedance matching between a source resonator and a PA of a wireless power transmission apparatus may be maintained despite the occurrence of systematic changes such as, for example, a change in a number of wireless power reception apparatuses, a change in a load impedance, and the like. Accordingly, the wireless power transmission system may be designed efficiently without an additional matching network.

When a difference between values of U calculated with respect to a source resonator and a target resonator of the wireless power transmission system is maintained within a range of 30%, it may be determined that a compatibility between the resonators having different characteristics is maintained.

The PA used herein is not limited to a class-E PA, and any type of PA may be used.

A capacitor may be inserted in series or in parallel at any position between a power supply unit and a source resonator in a wireless power transmission apparatus, and may be inserted in series or in parallel at any position between a target resonator and a power converter in a wireless power reception apparatus.

Described above is an example of an apparatus for transmitting power wirelessly, the apparatus including a source resonator configured to transmit power wirelessly to a target resonator through a mutual resonance with the target resonator, a power supply unit configured to supply power to the source resonator, and a matching unit configured to connect, based on a characteristic of the power supply unit, a passive device to the power supply unit in series or parallel to match an output impedance of the power supply unit and an input impedance of the source resonator. The passive device may include a capacitor configured to have a capacitance required for removing an inductance of the power supply unit.

Further described above is an example of an apparatus for receiving power wirelessly, the apparatus including a target resonator configured to receive power wirelessly from a source resonator through a mutual resonance with the source resonator, a power converter configured to convert the received power into a form and a level required for a load, and a matching unit configured to connect a passive device to the power converter in series or parallel to match an input impedance of the power converter and an output impedance of the target resonator. The passive device may include a capacitor configured to have a capacitance required for removing an inductance of the power converter.

Further described above is an example of a wireless power transmission system, including a wireless power transmission apparatus configured to connect, based on a characteristic of the power supply unit, a first passive device to a power supply unit to match an output impedance of the power supply unit and an input impedance of a source resonator, and transmit power wirelessly to a target resonator through a mutual resonance between the source resonator and the target resonator, and a wireless power reception apparatus configured to connect, based on the characteristic of the power supply unit, a second passive device to a power converter to match an input impedance of the power converter and an output impedance of the target resonator, and receive power wirelessly from the source resonator through the mutual resonance.

An example of a method of transmitting power wirelessly is further described above. The method may involve supplying power from a power supply unit to a source resonator, connecting, based on a characteristic of the power supply unit, a passive device to the power supply unit in series or parallel to match an output impedance of the power supply unit and an input impedance of the source resonator, and transmitting power wirelessly to a target resonator through a mutual resonance between the source resonator and the target resonator.

An example of a method of receiving power wirelessly is further described above. The method may involve connecting a passive device to a power converter in series or parallel to match an input impedance of the power converter and an output impedance of a target resonator, receiving power wirelessly from a source resonator through a mutual resonance between the target resonator and the source resonator, and converting the received power into a form and a level required for a load.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

As a non-exhaustive illustration only, a mobile terminal described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for transmitting power wirelessly, the apparatus comprising:
a source resonator configured to transmit power wirelessly to a target resonator;
a power supply unit configured to supply power to the source resonator; and
a matching unit configured to connect a passive device to the power supply unit in series or in parallel according to an output impedance of the power supply unit, which changes based on a change in load impedance and a number of the target resonator, to match the changing output impedance of the power supply unit and an input impedance of the source resonator, wherein the input impedance is changed to match the changed output impedance.

2. The apparatus of claim 1, wherein the matching unit is configured to connect the passive device to the power supply unit in series or in parallel based on a characteristic of the power supply unit.

3. The apparatus of claim 1, wherein the power supply unit comprises a class-E power amplifier.

4. The apparatus of claim 1, wherein the passive device comprises a capacitor configured to store a capacitance for removing an inductance of the power supply unit.

5. The apparatus of claim 4, wherein the capacitor is configured to store the capacitance expressed by the following equation:

$$Cfn=1/((2\pi f)^2*Lfn),$$

wherein Cfn denotes the capacitance of the capacitor, Lfn denotes the inductance, and f denotes a resonant frequency.

6. The apparatus of claim 1, wherein the power supply unit comprises:
an alternating current-to-direct current (AC/DC) converter configured to convert an AC voltage from a power supply into a DC voltage; and
a power amplifier (PA) configured to convert the converted DC voltage into an AC voltage using a resonant frequency, and to amplify the converted AC voltage.

7. The apparatus of claim 1, wherein the matching unit is configured to:
connect the passive device to the power supply unit in series based on a characteristic of the power supply unit to convert an input impedance characteristic of the source resonator to an input impedance characteristic of a parallel resonator; or
connect the passive device to the power supply unit in parallel based on the characteristic of the power supply unit to convert the input impedance characteristic of the source resonator to an input impedance characteristic of a series resonator.

8. The apparatus of claim 1, further comprising a transmission controller configured to determine an initial wireless power to be transmitted based on a change in a temperature of the apparatus, a battery state of a target device, a change in an amount of power received at the target device, or a change in a temperature of the target device.

9. An apparatus for receiving power wirelessly, the apparatus comprising:
a target resonator configured to receive power wirelessly from a source resonator;
a power converter configured to convert the received power into a form and a level that corresponds to a load; and
a matching unit configured to connect a passive device to the power converter in series or in parallel to match an input impedance of the power converter and an output impedance of the target resonator,
wherein the passive device is configured to control a connection between the passive device and the power converter to be in parallel or to be in series in response to a passive device of a wireless power transmitter connected to a power supply unit of the wireless power transmitter in parallel or series, and
wherein the passive device of the wireless power transmitter is configured to connect to the power supply unit of the wireless power transmitter in parallel or in series according to an output impedance of the power supply unit, which changes based on a change in load impedance and a number of the target resonator.

10. The apparatus of claim 9, wherein the passive device comprises a capacitor configured to store a capacitance for removing an inductance of the power converter.

11. The apparatus of claim 10, wherein the capacitor is configured to store the capacitance expressed by the following equation:

$$1/(4*(2\pi f)^2*Lfn) \leq Cfn \leq 4/((2\pi f)^2*Lfn),$$

wherein Cfn denotes the capacitance of the capacitor, Lfn denotes the inductance, and f denotes a resonant frequency.

12. The apparatus of claim 9, wherein the power converter comprises:
a rectification unit configured to convert an alternating current (AC) voltage induced in the target resonator into a direct current (DC) voltage; and
a DC-to-DC (DC/DC) converter configured to convert an amplitude of the converted DC voltage into a DC voltage having an amplitude corresponding to the load.

13. The apparatus of claim 9, wherein the matching unit is configured to:
connect a passive device to the power converter in series to convert an output impedance characteristic of the target resonator to an output impedance characteristic of a parallel resonator; or
connect the passive device to the power converter in parallel to convert the output impedance characteristic of the target resonator to an output impedance characteristic of a series resonator.

14. The apparatus of claim 9, further comprising a reception controller configured to adjust an impedance of the target resonator to modulate a signal to be transmitted to a source device that is configured to supply power through the source resonator.

15. A method of transmitting power wirelessly, the method comprising:
supplying power from a power supply unit to a source resonator;
connecting a passive device to the power supply unit in series or in parallel to match an output impedance of the power supply unit and an input impedance of the source resonator; and
transmitting power wirelessly to a target resonator through a mutual resonance between the source resonator and the target resonator,
wherein the passive device is configured to control a connection between the passive device and the power supply unit to be in series or to be in parallel according to the output impedance which changes based on a change in load impedance and a number of the target resonator, and
wherein the input impedance changes to match the changed output impedance.

16. The method of claim 15, wherein the connecting of the passive device to the power supply unit in series or in parallel is performed based on a characteristic of the power supply unit.

17. The method of claim 15, wherein the power supply unit comprises a class-E power amplifier.

18. The method of claim 15, further comprising:

determining a compatibility between the source resonator and another target resonator, based on a difference between a first power link performance index between the source resonator and the target resonator and a second power link performance index between the source resonator and the other target resonator.

19. The method of claim 16, wherein the determining comprises determining that the compatibility between the source resonator and the other target resonator is maintained in response to the difference being within a range of 30%.

20. A method of receiving power wirelessly, the method comprising:

connecting a passive device to a power converter in series or in parallel to match an input impedance of the power converter and an output impedance of a target resonator;

receiving power wirelessly from a source resonator through a mutual resonance between the target resonator and the source resonator; and converting the received power into a form and a level that corresponds to a load, wherein the passive device is configured to control a connection between the passive device and the power converter to be in parallel or to be in series in response to a passive device of a wireless power transmitter connected to a power supply unit of the wireless power transmitter in parallel or series, and wherein whether the passive device of the wireless power transmitter is to be connected to the power supply unit of the wireless power transmitter in parallel or series according to an output impedance of the power supply unit, which changes based on a change in load impedance and a number of the target resonator.

* * * * *